(12) United States Patent
Souza

(10) Patent No.: US 9,475,216 B2
(45) Date of Patent: Oct. 25, 2016

(54) METHODS OF DISPERSING NANOPARTICLES INTO A MATRIX

(71) Applicant: MILLIKEN INFRASTRUCTURE SOLUTIONS, LLC, Spartanburg, SC (US)

(72) Inventor: James M. Souza, Houston, TX (US)

(73) Assignee: Milliken & Company, Spartanburg, SC (US)

(*) Notice: Subject to any disclaimer, the term of this patent is extended or adjusted under 35 U.S.C. 154(b) by 93 days.

(21) Appl. No.: 13/815,745

(22) Filed: Mar. 15, 2013

(65) Prior Publication Data

US 2016/0001470 A1 Jan. 7, 2016

(51) Int. Cl.
| | |
|---|---|
| B29C 41/28 | (2006.01) |
| B29C 41/36 | (2006.01) |
| B29C 41/44 | (2006.01) |
| B29C 70/50 | (2006.01) |
| B29K 101/10 | (2006.01) |
| B29K 105/16 | (2006.01) |
| B29K 707/04 | (2006.01) |

(52) U.S. Cl.
CPC .............. *B29C 41/28* (2013.01); *B29C 41/36* (2013.01); *B29C 41/44* (2013.01); *B29C 70/50* (2013.01); *B29K 2101/10* (2013.01); *B29K 2105/167* (2013.01); *B29K 2707/04* (2013.01)

(58) Field of Classification Search
None
See application file for complete search history.

(56) References Cited

U.S. PATENT DOCUMENTS

| | | | | |
|---|---|---|---|---|
| 4,676,276 A * | 6/1987 | Fawley | ............... | F16L 57/00 138/172 |
| 4,700,752 A * | 10/1987 | Fawley | ............... | B29C 53/66 138/172 |
| 5,348,801 A * | 9/1994 | Venzi | ............... | B32B 27/12 138/97 |
| 5,445,848 A * | 8/1995 | Venzi | ............... | B32B 27/12 156/287 |
| 5,632,307 A * | 5/1997 | Fawley | ............... | F16L 55/1686 138/97 |
| 6,276,401 B1 * | 8/2001 | Wilson | ............... | F16L 58/1063 138/172 |
| 6,774,066 B1 * | 8/2004 | Souza | ............... | B32B 15/04 138/99 |
| 7,367,362 B2 * | 5/2008 | Rice | ............... | B29C 70/32 138/172 |
| 7,387,138 B2 * | 6/2008 | Rice | ............... | F16L 55/1686 138/97 |
| 7,426,942 B2 * | 9/2008 | Rice | ............... | F16L 55/175 138/97 |
| 7,500,494 B2 * | 3/2009 | Robinson | ............... | B29C 70/32 138/172 |
| 7,523,764 B2 * | 4/2009 | Lepola | ............... | F16L 55/1654 138/97 |

* cited by examiner

*Primary Examiner* — Nathan T Leong
(74) *Attorney, Agent, or Firm* — Cheryl J. Brickey

(57) ABSTRACT

Disclosed are methods and systems for dispersing nanoparticles into a matrix. Disclosed is a system and method for coating a carrier film with a resin, spraying the resin with a suspended nanoparticle solution, and then transferring the resin-nanoparticle matrix to a collection vessel for dispensing for end use. Also, suspended nanoparticle solution is sprayed onto carrier film, the film is dried, a fabric layer is coated with resin layer, and nanoparticles are then transferred into the fabric resin layer to create a nanoparticle-infused fabric matrix. Fabric layers can also be coated with resin and sprayed with nanoparticles. Also disclosed is a system and method for coating a first carrier film with nanoparticles, coating a second carrier film with resin, and transferring nanoparticles from first carrier into the resin layer on the second carrier to create a nanoparticle infused resin material that can be collected and dispensed for end use.

20 Claims, 27 Drawing Sheets

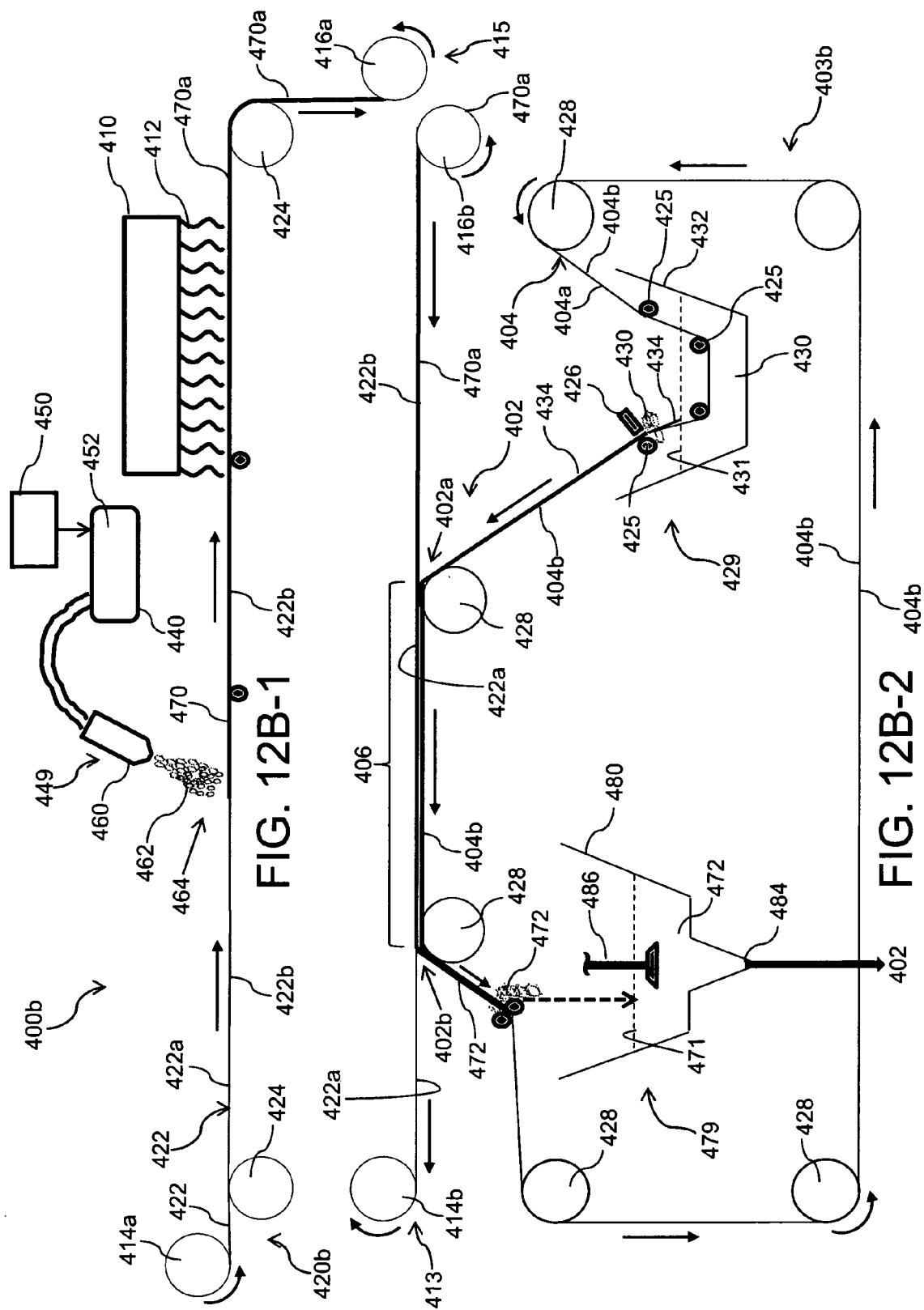

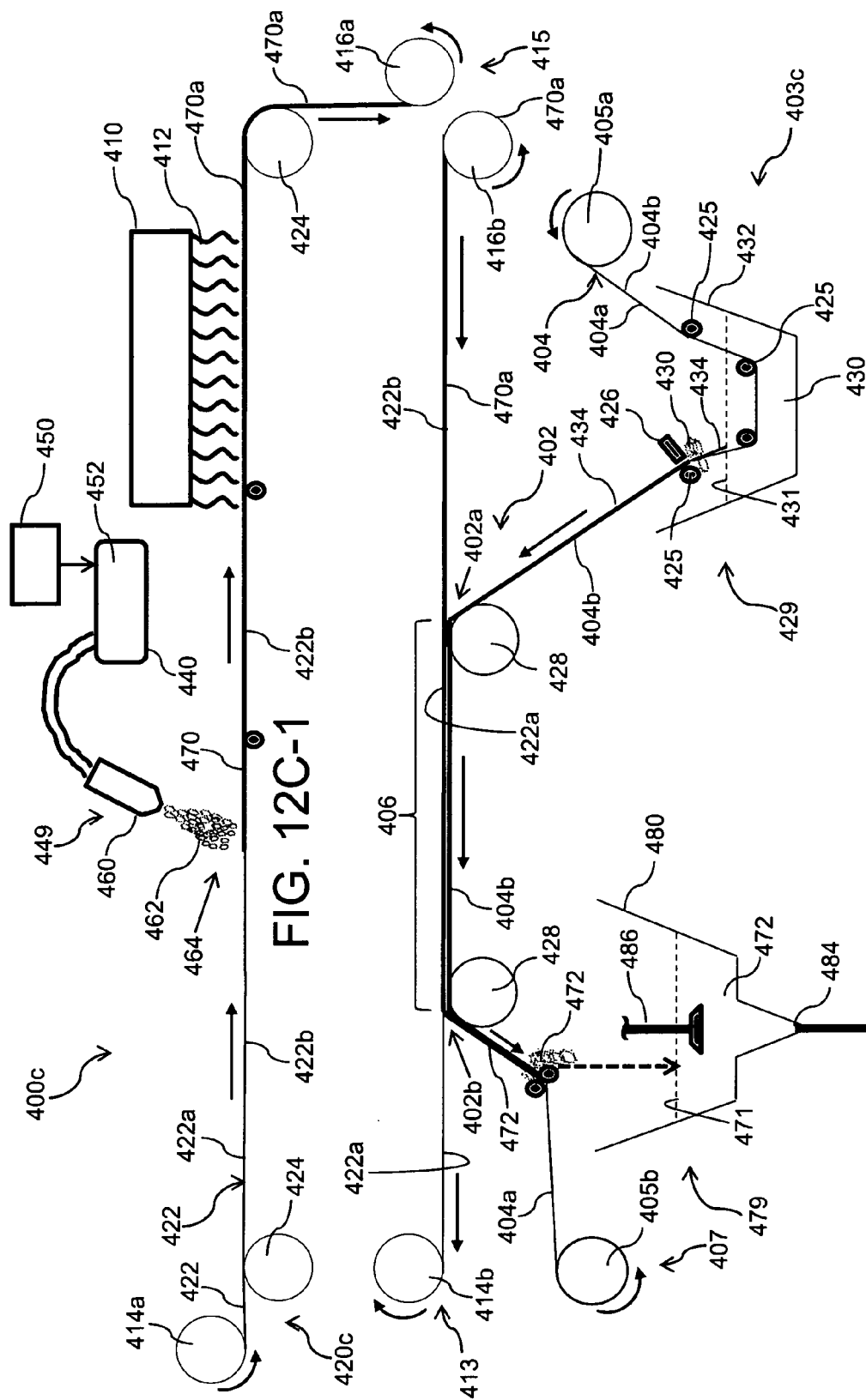

METHODS OF DISPERSING NANOPARTICLES INTO A MATRIX

CROSS-REFERENCE TO RELATED APPLICATIONS

The present application is a continuation-in-part of U.S. Nonprovisional application Ser. No. 12/947,762 filed Nov. 16, 2010 which in turn claims the benefit of the filing date of U.S. Provisional Application No. 61/281,410 filed Nov. 17, 2009. This application further claims the priority of U.S. Provisional Application No. 61/612,191, filed Mar. 16, 2012.

STATEMENT REGARDING FEDERALLY SPONSORED RESEARCH OR DEVELOPMENT

Not Applicable.

BACKGROUND OF THE INVENTION

1. Field of the Invention

The present invention is directed to a device for repairing or reinforcing a member such as a tubular member, a pipeline, or structural support, which device comprises fabric and nanomaterial toughening and strengthening material and a polymer matrix. This invention also relates generally to the field of nanoparticles, and more specifically, to methods for dispersing nanoparticles into a matrix or compound.

2. Background/Description of Related Art

A wide variety of devices, apparatuses, systems and methods for repairing or reinforcing members such as pipe, pipelines, and structural members are known, including, but not limited to, the disclosures in U.S. Pat. Nos. 4,700,752; 5,348,801; 5,445,848; 5,632,307; 4,676,276; 6,276,401; 6,774,066; 7,387,138; 7,426,942; 7,367,362; 7,500,494; and 7,523,764—all incorporated fully herein for all purposes.

Structural members can be degraded, i.e., physically damaged or deteriorated due to cyclic loading fatigue enhanced by corrosion, erosion, temperature fluctuations, natural causes, third party causes, and time. Degraded members often require repair and/or reinforcement to preserve and/or restore their integrity and extend their useful life. The problems resulting from damage and deterioration affect piping systems which are subject to deterioration due to several factors, including sulfate reducing bacteria, galvanic action, and third party damage. The problem is not limited to piping systems. It also affects other structures such as piling, concrete columns, petroleum storage tanks, etc. which are subject to deterioration and damage.

Older methods of repairing damaged pipelines comprise the replacement of the damaged or defective pipe section with new pipe or the installation of a metal sleeve over the damaged or defective area. Depressurizing the pipe or putting the pipe out of service while the pipe replacement is performed is often required for these known pipe repair methods. This procedure can become costly and inconvenient for the pipeline owner as well as the general public.

Advances in composite materials and methods in the past two decades have introduced composites as a more widely accepted repair method for piping and infrastructure rehabilitation. Composites have offered owners of pipelines a cost-effective alternative to the disruption of service caused by pipe replacement or steel sleeves because composite repairs can be applied to the damaged areas while the pipeline is still in operation.

Known pipe repair and reinforcement systems include a fabric impregnated with a moisture-curing polyurethane polymer system or a fabric impregnated with a resin polymer in the field during installation of the product or a cured pre-form that is bonded with an adhesive as it is wrapped around a member. These products provide reasonable performance and service life. However, there is a need for improved performance especially in the area of extended fatigue/service life.

Permanence of a Fiber Reinforced Polymer, "FRP" composite repair is a requirement for pipeline repair methods under current DOT regulations (49 CFR §§192, 195; incorporated fully herein). The question of permanence of some FRP composite repairs has become of great concern to pipeline owners due to delaminations due to fatigue of some composite systems.

Consequently, these failed FRP's have provided questionable permanent repairs. DOT has ruled that FRP repairs are temporary unless the pipe is repaired by a method that reliable engineering tests and analyses show permanently restores the serviceability of the pipe.

With the discovery of nanoparticles, it has been scientifically shown under laboratory conditions that the physical properties of a matrix and/or composite material such as tensile strength, tensile modulus, thermal and electrical conductivity, toughness, durability, etc., are enhanced with the incorporation of nanoparticles such as but not limited to nanotubes, graphene, nanofibers, bucky balls, nano clays, etc. (collectively "nanoparticles"). For example, it is known in the art that in the laboratory, epoxies have been impregnated with nanoparticles to form a hardened material. A matrix, in this sense, is generally understood to be defined as a pre-cured material, liquid or molten state that may include for example, but is not limited to, polyester resin, vinyl ester resin, epoxy resin, polyethylene, polypropylene, nylon, rubber, and the like. The composite material may generally be defined as any material that incorporates a fiber or aggregate that increases the resultant material's "load carrying" capability.

Although these nanoparticles enhance the physical material properties of a matrix and/or composite material, there are two challenges that remain in converting laboratory research results into viable full scale manufacturing. These challenges center about ensuring the proper and uniform placement of these nanoparticles within the material to be enhanced. The initial difficulty is related to the large aspect ratio (length versus diameter) that causes difficulty in separating the nanoparticles from themselves. This is analogous to separating wet spaghetti noodles that are balled up.

The second, but most critical challenge of integrating nanoparticles, is that once the nanoparticles are separated, it is important to ensure the even dispersement or placement of the nanoparticles into the matrix. Improperly placed nanoparticles, or poorly dispersed nanoparticles, can result in the formation of nano-cluster pockets which create areas of embrittlement resulting in premature failure of the matrix instead of enhancement of the matrix. This specific challenge is probably the one single largest problem in advancing nano-technology into the arena of actual products. Advancing from dispersion of nanoparticles into a matrix at the laboratory bench scale to a commercial scale has proven a difficult task, and current methods are inadequate.

Berger (2008) describes that owing to the fact that carbon nanotubes (CNTs) are insoluble in most solvents, and other liquids, such as polymer resins and water, it becomes difficult to evenly disperse CNTs into a liquid matrix such as epoxies and other polymers. This in turn complicates efforts to use the outstanding physical properties of CNTs in the manufacture of nanocomposite materials. It also complicates efforts for preparation of uniform mixtures of CNTs with different organic, inorganic and polymeric materials for use in other practical nanotechnology applications.

Current methods for separating nanoparticles involve suspension of the nanoparticles into a carrier such as a solvent through vibration by a sonication device, then introducing the suspended nanoparticles to the matrix and dispersing the suspension throughout the matrix by a mixing process that utilizes high shear mixing blades for some length on time. While this process does work, it is unrealistic for manufacturing because, for example, the abovementioned process requires approximately 7 hours of time to process 300 ml of epoxy matrix. Another method involves a three roll mixer that kneads and rolls the material around, but this method is inadequate because it is extremely difficult to achieve any predictability of uniform nanomaterial dispersion with changes in mix batch sizes. Additionally, while a hardened, nanoparticle-reinforced epoxy has been produced at the lab bench scale, there exists a need to provide for in-situ repairs using such nanoparticle-reinforced materials so that such reinforced materials may be applied to the repair surface prior to hardening.

As such, there exists a great need to improve the methods of dispersing nanoparticles into a matrix and/or compound at a commercial level and the present invention provides such methods. Therefore, the present disclosure is directed to methods for evenly dispersing nanoparticles into a matrix or compound for the enhancement of physical properties of the matrix which may be used as a stand-alone product or enhance composite material properties when integrated with load-carrying fibers or aggregate. These methods enable the optimization of benefits derived from the addition of nanoparticles by the uniform placement of the particles within the matrix medium.

BRIEF SUMMARY OF INVENTION

In accordance with the present invention, a fabric device is provided for an in-situ application on an area of a structural member. A fabric device according to the present invention comprises at least one layer of fabric which is formed of a composite material having first and second spaced apart surfaces and nanomaterials. A fabric device according to the present invention further comprises a resin matrix on the fabric which covers the nanomaterials. A fabric device is described for application on a degraded area of a member for rehabilitating the member. A fabric device in accordance with the present invention comprises at least one layer of composite fabric, which has a first surface and a second surface spaced-apart from the first surface, nanomaterial on at least one surface of the fabric, and a resin matrix on the fabric over the nanomaterial. The resin matrix may also comprise nanomaterial therein.

In one embodiment of the present invention, at least one layer of fabric in the fabric device is formed from fibers which themselves contain nanomaterials. In another embodiment of the present invention, the nanomaterials are bonded to one or both surfaces of the fabric. In yet another embodiment of the present invention, the nanomaterials are in the matrix and then applied to one or both surfaces of the fabric which may or may not contain nanomaterials. In another embodiment, at least one layer of fabric is a plurality of adjacent layers of fabric and at least one surface of each layer has nanomaterial thereon.

The "fabric," before treatment according to the present invention, can be any suitable known fabric, cloth, fibrous item, material, or webbing, e.g. made of natural fibers or synthetic fibers (or any combination thereof), made by any known method, e.g. woven, stitched, weaved, knitted, braided or nonwoven. The "nanomaterials" or nanoparticles may be any suitable known nanotubes, (in any form) nanofibers, nanomaterials, nanoclays, bucky paper, nanowire, graphene and nanoinclusions (treated or untreated), or any combination thereof. The resin matrix may, for example, may be thermosetting resins, e.g. epoxy, thermoset polymers, polyurethane resins or thermoplastic polymers.

A fabric device according to the present invention may further comprise nanomaterials in the resin matrix to inhibit crack propagation.

In certain embodiments, a device according to the present invention includes a high strength fabric [e.g., fiber, veil, cloth, webbing] made from any high tenacity fiber such as, but not limited to, fiberglass, carbon fiber, p-aramid fiber, liquid crystal polymer fiber, and any combinations thereof, that has nanomaterial (nanotubes, nanofibers, nanoclays, bucky paper, graphene or any combination thereof) embedded on a surface or surfaces of the fabric and which, when combined with a curable resin matrix, forms a pressure-containing or structural reinforcement with improved properties such as improved interfacial fracture toughness, thus resulting in extended fatigue and service life, e.g., under natural force conditions such as seismic waves from earthquakes.

Disclosed are methods and systems for dispersing nanoparticles into a matrix. For example, disclosed is a system and method for coating a carrier film with a resin, spraying the resin with a suspended nanoparticle solution, and then transferring the resin-nanoparticle matrix to a collection vessel for dispensing for end use. Also, in another embodiment, suspended nanoparticle solution is sprayed onto carrier film, the film is dried, a fabric layer is coated with resin layer, and nanoparticles are then transferred into the fabric resin layer to create a nanoparticle-infused fabric matrix. Fabric layers can also be coated with resin and sprayed with nanoparticles. Also disclosed is a system and method for coating a first carrier film with nanoparticles, coating a second carrier film with resin, and transferring nanoparticles from first carrier into the resin layer on the second carrier to create a nanoparticle infused resin material that can be collected and dispensed for end use.

The present disclosure also describes a system for dispersing nanoparticles into a matrix. This system uses a moveable carrier film capable of moving in a first direction through the system, the carrier film having a top side and an under side. A carrier film conveyor system moves the carrier film. The system also employs a resin coating station comprising a basin containing a desired neat resin material at a desired level, the basin comprising an entrance capable of receiving the carrier film, one or more guides to direct the carrier film into the resin material to permit at least the carrier film top side to become coated with the resin material, and an exit where the resin coated carrier film is discharged from the resin coating station. A nanoparticle deposition station is also used, having an entrance proximate to the resin coating station exit for receiving the resin coated carrier film and an exit, the nanoparticle deposition station further comprising a mixing chamber containing a solution of suspended nanoparticles and a nanoparticle spray unit capable of receiving the suspended nanoparticles from the mixing chamber and spraying the suspended nanoparticles through a spray nozzle in a desired spray pattern towards the top surface of the resin coated carrier film to create a nanoparticle-infused resin matrix layer. An end product collection station receives the carrier film containing the nanoparticle-infused resin matrix layer, the end product collection station comprising an impingement device to remove the nanoparticle-infused resin matrix layer from the top of the carrier film as the carrier film passes therethrough, a collection vat for receiving the removed nanoparticle-infused resin matrix layer, the collection vat having a low speed agitator for mixing the contents of the collection vat, and a discharge port for discharging the collected nanoparticle-infused resin matrix layer end product.

In one embodiment, the resin coating station guides are rollers.

The resin coating station may further comprise a scraper proximate to the resin coating station exit for adjusting the thickness of the coating of resin material on the carrier film top side.

In one embodiment, the spray nozzle is an atomizer nozzle spraying the suspended nanoparticle solution toward the resin coated carrier film top surface in a near solvent-free state.

In the methods and systems disclosed herein, the nanoparticles may be functionalized.

The mixing chamber may further comprise a source of sonication for maintaining the solution of suspended nanoparticles in a suspended state.

In one embodiment, the carrier film is moved through the system in a continuous loop. Alternatively, the carrier film may be moved through the system in a single pass through.

Also disclosed is a system for dispersing nanoparticles into a fabric matrix comprising a moveable carrier film capable of moving in a first direction through the system, the carrier film having a top side and an under side; a carrier film conveyor system capable of moving the carrier film; a nanoparticle deposition station having an entrance for receiving the carrier film and an exit, the nanoparticle deposition station further comprising a mixing chamber containing a solution of nanoparticles suspended in a solvent and a nanoparticle spray unit capable of receiving the suspended nanoparticle solution from the mixing chamber and spraying the suspended nanoparticle solution through a spray nozzle in a desired spray pattern towards the top surface of the carrier film to deposit the nanoparticles onto the top surface of the carrier film; a heating section for drying any residual solvent from the nanoparticles deposited onto the top surface of the carrier film; a moveable fabric layer capable of moving in a first direction through the system, the fabric layer having a top side and an under side; a fabric layer conveyor system capable of moving the fabric layer; a resin coating station comprising a basin containing a desired neat resin material at a desired level, the basin comprising an entrance capable of receiving the fabric layer, one or more guides to direct the fabric layer into the resin material to permit at least the fabric layer top side to become coated with the resin material, and an exit where the resin coated fabric layer is discharged from the resin coating station; a transfer operation section having an entrance and an exit, and contact zone between the transfer section entrance and exit, the transfer operation section capable of receiving the nanoparticle-coated carrier film and the resin-coated fabric layer and passing both through the contact zone so that the top side of the carrier film containing the nanoparticles is in contact with the top side of the resin-coated fabric layer to thereby permit the nanoparticles on the carrier film to be transferred to the resin-coated fabric layer to create a nanoparticle-infused resin fabric product; and an end product collection station for receiving the nanoparticle-infused resin fabric product. In this embodiment, the end product collection station may comprise one or more spools for receiving the nanoparticle-infused resin fabric product, and the contact zone may comprise one or more sets of impingement devices to compress the carrier film and fabric film together. In this embodiment, the carrier film may be moved through the system in a continuous loop.

Alternatively, the system for creating a dispersion of nanoparticles into a fabric matrix can operate where the carrier film is not a continuous loop, and is moved through the nanoparticle deposition station and heating section in a single pass through to create a carrier film end product having a nanoparticle coating on the carrier film top surface, wherein the nanoparticle-coated carrier film end product may be directed to a carrier film end product collection station, wherein the collected nanoparticle-coated carrier film may be introduced into the transfer operation system to serve as the source of the nanoparticle-coated carrier film, and wherein the carrier film exits the transfer operation section and is collected in a carrier film collection station.

Also disclosed is a system for dispersing nanoparticles into a fabric matrix comprising: a moveable fabric layer capable of moving in a first direction through the system, the fabric layer having a top side and an under side; a fabric layer conveyor system capable of moving the fabric layer; a resin coating station comprising a basin containing a desired neat resin material at a desired level, the basin comprising an entrance capable of receiving the fabric layer, one or more guides to direct the fabric layer into the resin material to permit at least the fabric layer top side to become coated with the resin material, and an exit where the resin coated fabric layer is discharged from the resin coating station; a nanoparticle deposition station having an entrance proximate to the resin coating station exit for receiving the resin coated fabric layer and an exit, the nanoparticle deposition station further comprising a mixing chamber containing a solution of suspended nanoparticles and a nanoparticle spray unit capable of receiving the suspended nanoparticles from the mixing chamber and spraying the suspended nanoparticles through a spray nozzle in a desired spray pattern towards the top surface of the resin coated fabric layer to create a nanoparticle-infused resin fabric layer; a heating section for drying any residual solvent from the nanoparticles deposited onto the top surface of the fabric layer; and an end product collection station for receiving the fabric layer containing the nanoparticle-infused resin matrix layer, the end product collection station comprising an impingement device to remove the nanoparticle-infused resin matrix layer from the top of the carrier film as the carrier film passes there through, a collection vat for receiving the removed nanoparticle-infused resin matrix layer, the collection vat having a low speed agitator for mixing the contents of the collection vat, and a discharge port for discharging the collected nanoparticle-infused resin matrix layer end product.

Another embodiment describes a system for dispersing nanoparticles into a matrix comprising: a first moveable carrier film capable of moving in a first direction through the system, the first carrier film having a top side and an under side; a first carrier film conveyor system capable of moving the first carrier film; a nanoparticle deposition station having an entrance for receiving the first carrier film and an exit, the nanoparticle deposition station further comprising a mixing chamber containing a solution of nanoparticles suspended in a solvent and a nanoparticle spray unit capable of receiving the suspended nanoparticle solution from the mixing chamber and spraying the suspended nanoparticle solution through a spray nozzle in a desired spray pattern towards the top surface of the first carrier film to deposit the nanoparticles onto the top surface of the first carrier film; a heating section for drying any residual solvent from the nanoparticles deposited onto the top surface of the first carrier film; a second moveable carrier film capable of moving in a first direction through the system, the second carrier film having a top side and an under side; a second carrier film conveyor system capable of moving the second carrier film; a resin coating station comprising a basin containing a desired neat resin material at a desired level, the basin comprising an entrance capable of receiving the second carrier film, one or more guides to direct the second carrier film into the resin material to permit at least the second carrier film top side to become coated with the resin material, and an exit where the resin coated second carrier film is discharged from the resin coating station; a transfer operation section having an entrance and an exit, and contact zone between the transfer section entrance and exit, the transfer operation section capable of receiving the nanoparticle-coated first carrier film and the resin-coated second carrier film and passing both through the contact zone so that the top side of the first carrier film containing the nanoparticles is in contact with the top side of the resin-coated second carrier film to thereby permit the nanoparticles on the first carrier film to be transferred to the resin-coated second carrier film to create a nanoparticle-infused resin product; and an end product collection station for receiving the second carrier film containing the nanoparticle-infused resin matrix layer, the end product collection station comprising an impingement device to remove the nanoparticle-infused resin matrix layer from the top of the second carrier film as the carrier film passes therethrough, a collection vat for receiving the removed nanoparticle-infused resin matrix layer, the collection vat having a low speed agitator for mixing the contents of the collection vat, and a discharge port for discharging the collected nanoparticle-infused resin matrix layer end product. The contact zone may comprise one or more sets of impingement devices to compress the carrier film and fabric film together.

In one embodiment, the first carrier film is moved through the system in a continuous loop, and the second carrier film is moved through the system in a continuous loop.

In another embodiment, the second carrier film is moved through the system in a continuous loop; and the first carrier film is not a continuous loop, and is moved through the nanoparticle deposition station and heating section in a single pass through to create a first carrier film end product having a nanoparticle coating on the first carrier film top surface, wherein the nanoparticle-coated first carrier film end product may be directed to a first carrier film end product collection station, wherein the collected nanoparticle-coated first carrier film may be introduced into the transfer operation system to serve as the source of the nanoparticle-coated first carrier film, and wherein the first carrier film exits the transfer operation section and is collected in a first carrier film collection station.

In yet another embodiment, the first carrier film is not a continuous loop, and is moved through the nanoparticle deposition station and heating section in a single pass through to create a first carrier film end product having a nanoparticle coating on the first carrier film top surface, wherein the nanoparticle-coated first carrier film end product may be directed to a first carrier film end product collection station, wherein the collected nanoparticle-coated first carrier film may be introduced into the transfer operation system to serve as the source of the nanoparticle-coated first carrier film, wherein the first carrier film exits the transfer operation section and is collected in a first carrier film collection station; and the second carrier film is not a continuous loop, and is moved through the resin coating station and through the transfer operation station in a single pass through, and collected in the second carrier film collection station.

Still further, in another embodiment, the first carrier film is moved through the system as a continuous loop; and the second carrier film is not a continuous loop, and is moved through the resin coating station and through the transfer operation station in a single pass through, and collected in the second carrier film collection station.

The present disclosure also pertains to a number of methods for using the above-mentioned systems and for dispersing nanoparticles into a matrix. For example, one exemplary method comprises: (a) coating at least one side of a length of a carrier film with a thickness of a neat resin material to create a resin-coated carrier film layer; (b) mixing desired nanoparticles into a desired solvent to create a suspended solution of nanoparticles; (c) spraying the suspended nanoparticle solution onto the resin-coated carrier film layer to create a nanoparticle-infused resin matrix layer; (d) transferring the nanoparticle-infused resin matrix layer from the carrier film to a collection vessel; (d) providing continuous, slow speed agitation of the nanoparticle-infused resin matrix material in the collection vessel; and (e) dispensing the nanoparticle-infused resin matrix material from the collection vessel for desired end use. In one embodiment of this method, the carrier film may be provided as a continuous loop that passes through a resin vat to become coated with resin, is then sprayed with suspended nanoparticles, passes through a collection station to transfer the nanoparticle resin matrix layer to a collection vessel, and then returns to the resin vat. The additional step of adjusting the thickness of the resin layer may be employed if desired. Ideally, the thickness of the resin layer is adjusted to be less than ½ inch but of a sufficient thickness to receive a layer of nanoparticles Another method for dispersing nanoparticles into a fabric matrix comprises the steps of: mixing desired nanoparticles into a desired solvent to create a suspended solution of nanoparticles; spraying the suspended nanoparticle solution onto at least one side of a carrier film layer to create a nanoparticle-infused carrier film layer; heating the nanoparticle-infused carrier film layer to evaporate the solvent; coating at least one side of a length of a fabric layer with a desired thickness of a neat resin material to create a resin-coated fabric layer; compressing the layer of nanoparticles on the carrier film layer against the layer of resin on the fabric to transfer the nanoparticles from the carrier film layer into the fabric resin layer; and collecting the nanoparticle-infused fabric matrix for desired end use.

In yet another embodiment, there is described a method for dispersing nanoparticles into a fabric matrix comprising the steps of: (1) coating at least one side of a length of a fabric layer with a desired thickness of a neat resin material to create a resin-coated fabric layer; (2) mixing desired nanoparticles into a desired solvent to create a suspended solution of nanoparticles; (3) spraying the suspended nanoparticle solution onto the resin layer of the resin-coated fabric to create a nanoparticle-infused fabric matrix; (4) heating the nanoparticle-infused fabric matrix to evaporate the solvent; and (5) collecting the nanoparticle-infused fabric matrix for desired end use.

There is also disclosed a method for dispersing nanoparticles into a matrix comprising the steps of: mixing desired nanoparticles into a desired solvent to create a suspended solution of nanoparticles; spraying the suspended nanoparticle solution onto a first carrier film layer to create a nanoparticle-infused first carrier film layer; heating the nanoparticle-infused first carrier film layer to evaporate the solvent; coating at least one side of a length of a second carrier film with a thickness of a neat resin material to create a resin-coated second carrier film layer; compressing the layer of nanoparticles on the first carrier film layer against the layer of resin on the second carrier film to transfer the nanoparticles from the first carrier film layer into the second carrier film resin layer; transferring the nanoparticle-infused resin matrix layer from the second carrier film to a collection vessel; providing continuous, slow speed agitation of the nanoparticle-infused resin matrix material in the collection vessel; and dispensing the nanoparticle-infused resin matrix material from the collection vessel for desired end use.

BRIEF DESCRIPTION OF THE DRAWINGS

In the accompanying drawings:

FIG. 10B-2 schematically illustrates a variation of the method and system for dispersing nanoparticles into a matrix shown in FIG. 10A.

FIG. 12B-1 schematically illustrates a variation of the method and system for dispersing nanoparticles into a matrix shown in FIG. 12A.

FIG. 12B-2 schematically illustrates a variation of the method and system for dispersing nanoparticles into a matrix shown in FIG. 12A.

FIG. 12C-1 schematically illustrates a variation of the method and system for dispersing nanoparticles into a matrix shown in FIG. 12A.

FIG. 12C-2 schematically illustrates a variation of the method and system for dispersing nanoparticles into a matrix shown in FIG. 12A.

DETAILED DESCRIPTION OF THE INVENTION

It will be appreciated that the present invention may take many forms and embodiments. In the following description, some embodiments of the invention are described and numerous details are set forth to provide an understanding of the present invention. Those skilled in the art will appreciate, however, that the present invention may be practiced without those details and that numerous variations and modifications from the described embodiments may be possible. The following description is thus intended to illustrate and not to limit the present invention.

One embodiment of a fabric device according to the present invention comprises a fabric which is formed from fibers which themselves contain nanomaterials. In yet another embodiment of a fabric device in accordance with the present invention the fabric has nanomaterials applied to it.

Figure 1A:
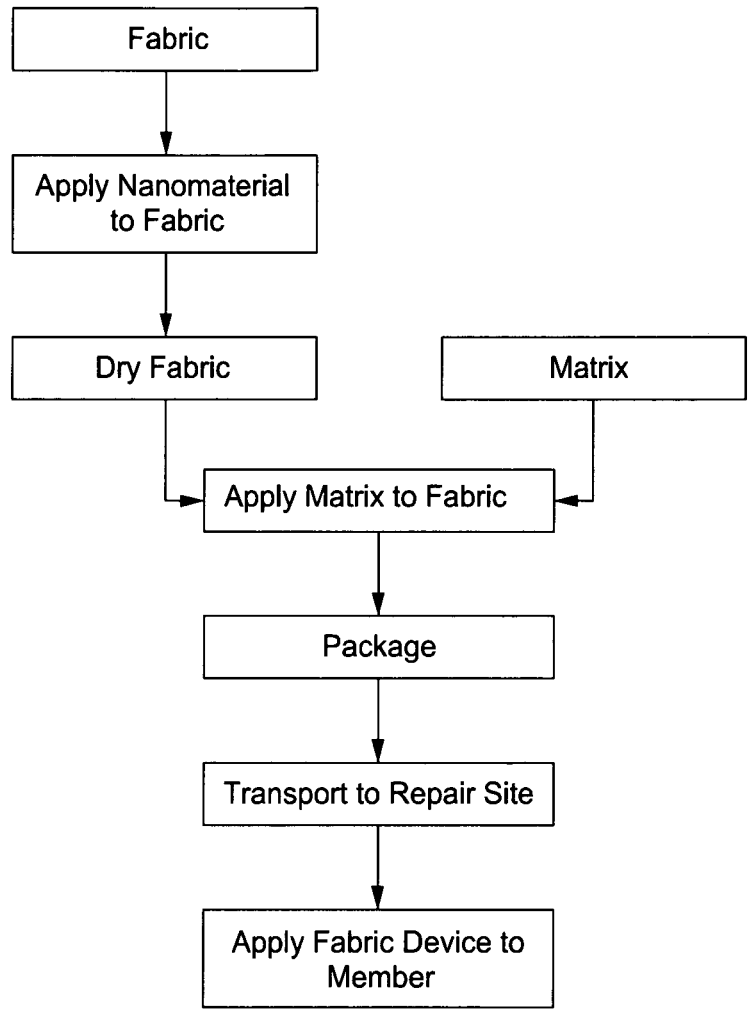
FIG. 1A is a flow diagram illustrating a method according to the present invention.

FIG. 1A shows schematically a method in which fabric ("Fabric") is provided and then has nanomaterial applied to it. The fabric is any fabric as defined above. The nanomaterial is any nanomaterial as defined above. The nanomaterial is applied onto the fabric, to one or both surfaces, by any application method or apparatus, including, but not limited to, by dipping, spraying, sprinkling, electro-static deposition, electro-spun, electrophoresis or manually (e.g. with a roller, trowel, brush, etc.). The nanomaterial may be in a suitable solution. In one aspect the nanomaterial is in a solvent solution.

The fabric with the applied nanomaterial is then dried ("Dry Fabric"), e.g. to remove solution material, e.g. water and/or solvent (e.g. alcohol, ethanol, acetone). A matrix is then applied to the dried fabric ("Apply Matrix"). Any suitable matrix material may be used, as defined above. In one aspect, the matrix is a resin, e.g. an epoxy resin, a thermoset resin, a polyurethane resin, or a thermoplastic resin.

The fabric device, fabric treated with the nanomaterial and the matrix, is then made into discrete amounts, e.g. for packaging ("Package") and shipping or for installation.

Figure 1B:
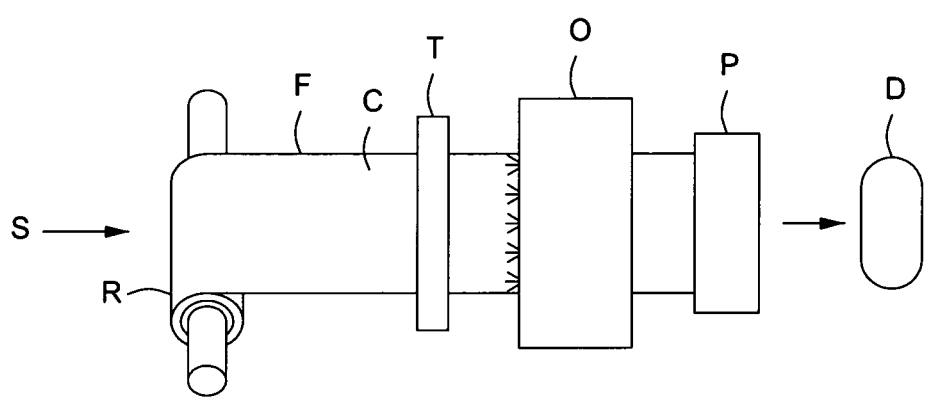
FIG. 1B is a flow diagram illustrating a method according to the present invention.

FIG. 1B illustrates schematically a system S for making a device D according to the present invention. Fabric from a roll R of fabric F (any fabric as defined above) is supplied to a deposition apparatus T which deposits nanomaterial (any as defined above) in solution onto a surface C of fabric F. The thus-treated fabric is then dried in an oven O to remove solution material (e.g. solvent).

Treated fabric A is then introduced to apparatus P for sizing, cutting, wrapping, packaging, etc. A finished fabric device D is ready for use or shipment. In one aspect a package with a device according to the present invention is hermetically sealed and aluminized plastic package material is used.

In certain embodiments, a fabric device according to the present invention, with a matrix applied thereto, is packaged and then sent to the field for use. For example, and not by way of limitation, a fabric device according to the present invention, made in accordance with the methods of FIG. 1A or FIG. 1B, may have nanomaterial material applied to fabric, the fabric then dried, then impregnated with a resin (e.g., but not limited to, polyurethane resin) and then packaged in packaging material, e.g., a dehumidified foil pouch. The packaged fabric device is sent to the field for application to a member that needs reinforcing and/or repair.

Figure 1C:
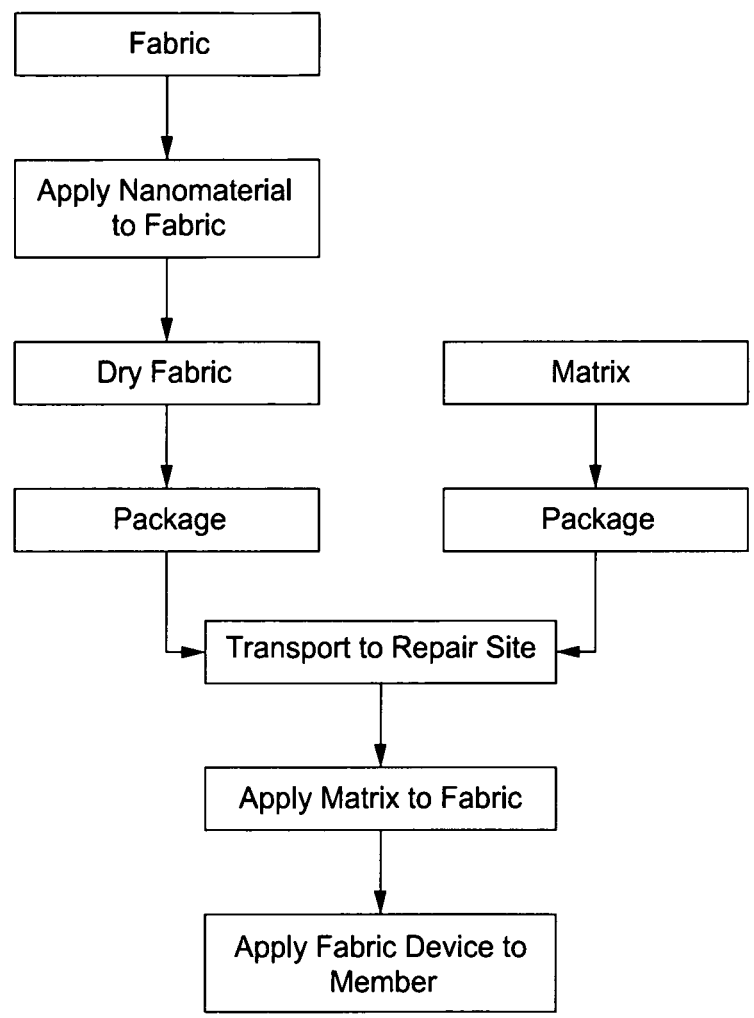
FIGS. 1C-1M are flow diagrams illustrating methods according to the present invention.
Figure 1D:
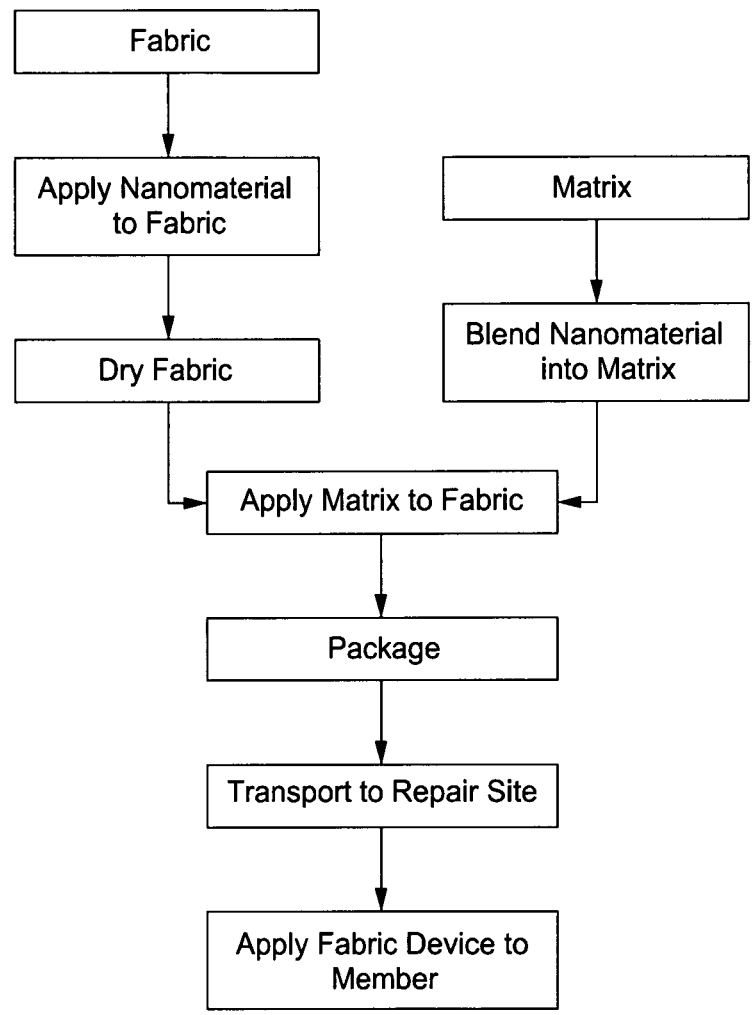
Figure 1E:
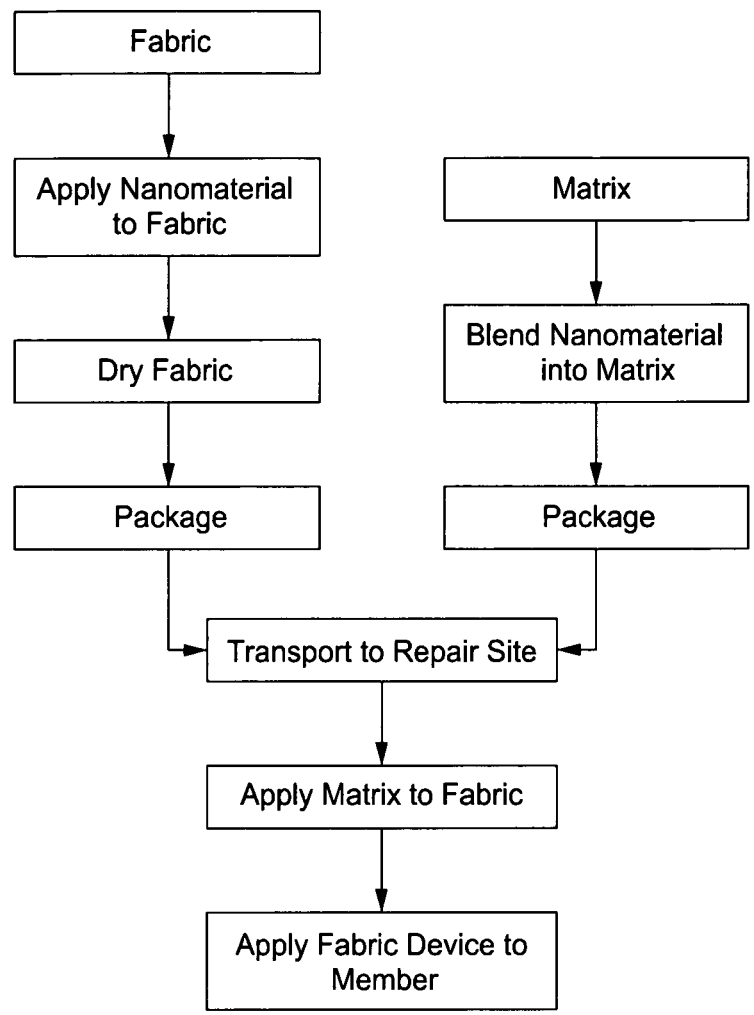

It is also within the scope of the present invention to provide a fabric device that is shipped without the matrix yet impregnated therein. FIG. 1C illustrates a method according to the present invention (like words indicate like steps and things), but in which a fabric device without a matrix is packaged and transported to the repair site. The resin matrix is prepared, packaged and transported to the repair site, where the resin matrix is applied to the fabric to form the fabric device. The matrix may be any disclosed herein and, in one aspect, the matrix is a matrix with nanomaterial added thereto as illustrated in FIG. 1D. The matrix with nanomaterials may be applied to the fabric before being transported to the repair site (FIG. 1D) or may be packaged, shipped to the repair site and applied to the fabric at the repair site (FIG. 1E).

Figure 1F:
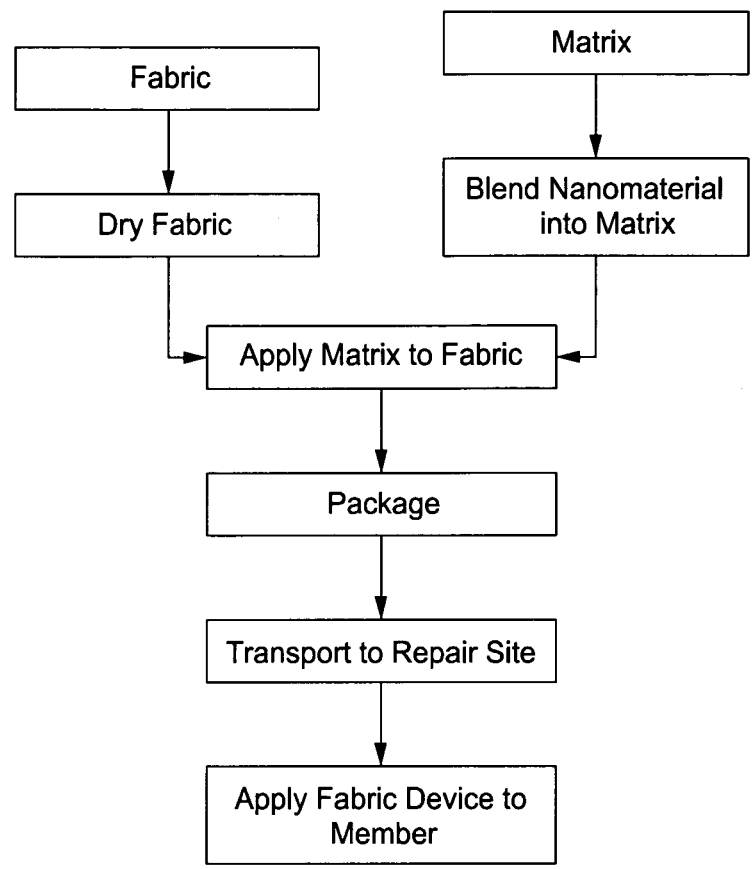
Figure 1G:
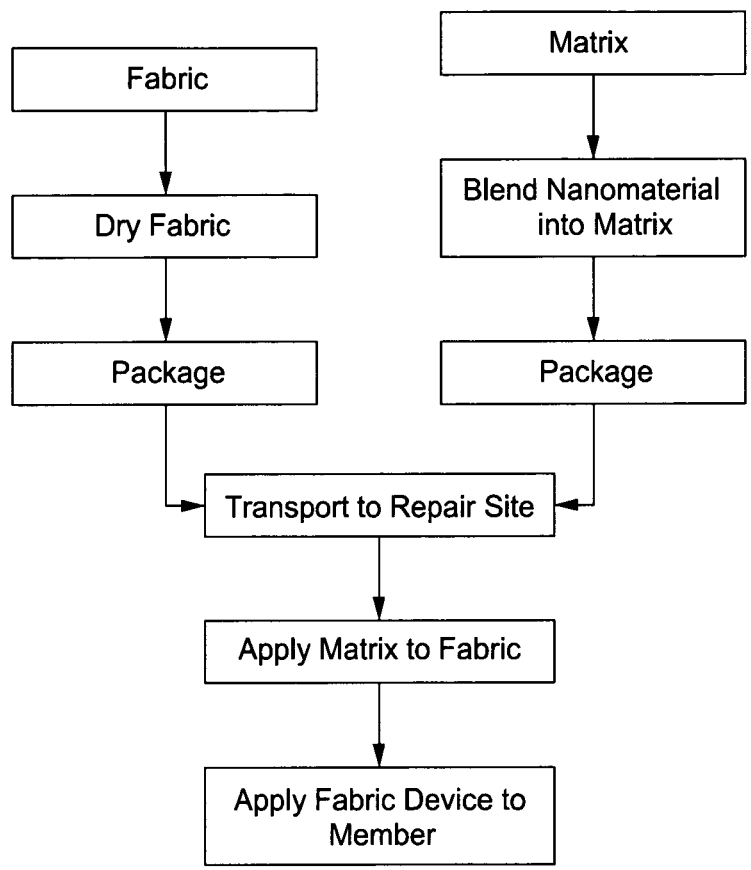

With reference to FIGS. 1F and 1G, in one embodiment of the present invention nanomaterials are not applied to the fabric, but are blended into the matrix. The matrix may be applied to the fabric before shipment to the repair site (FIG. 1F) or alternatively the matrix may be applied to the fabric at the repair site (FIG. 1G).

Figure 1H:
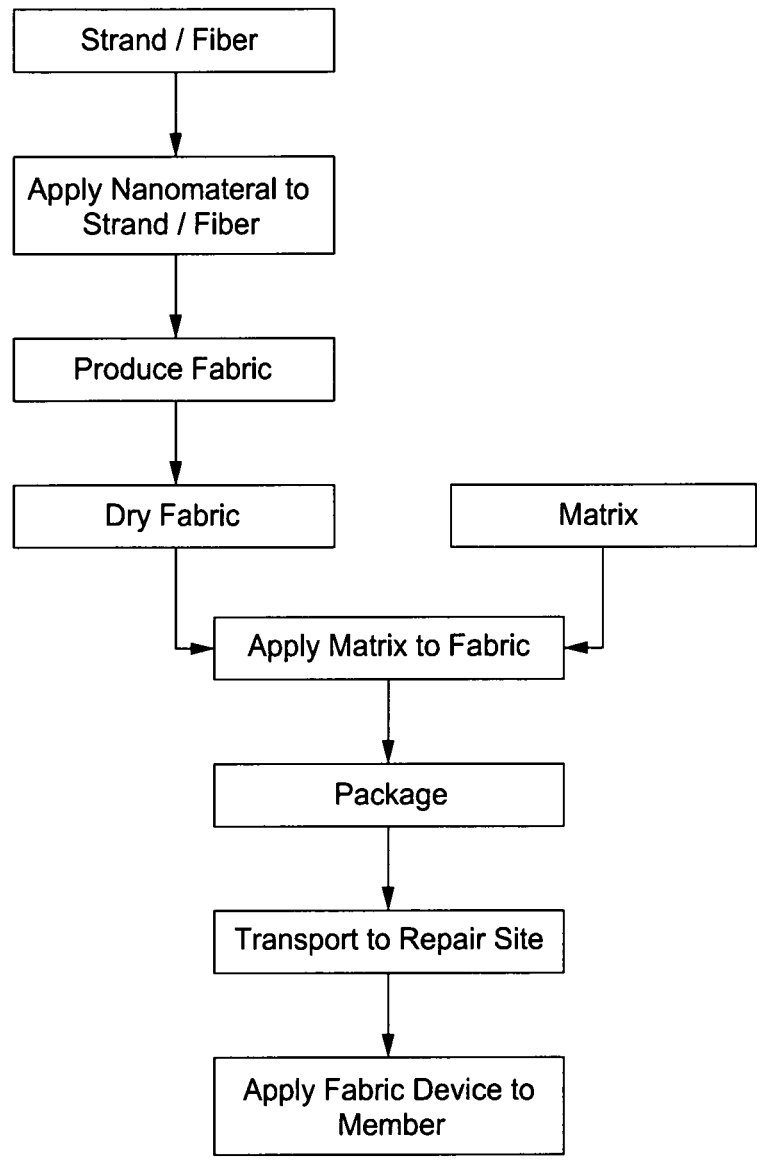
Figure 1I:
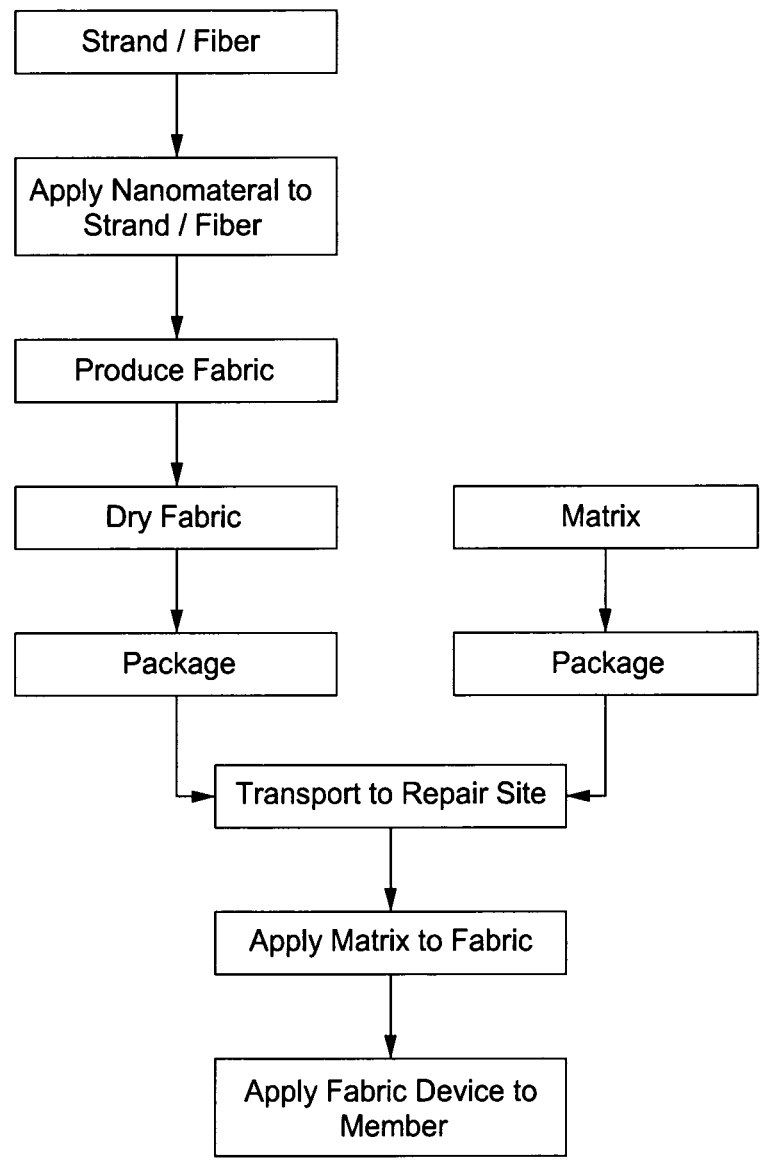
Figure 1J:
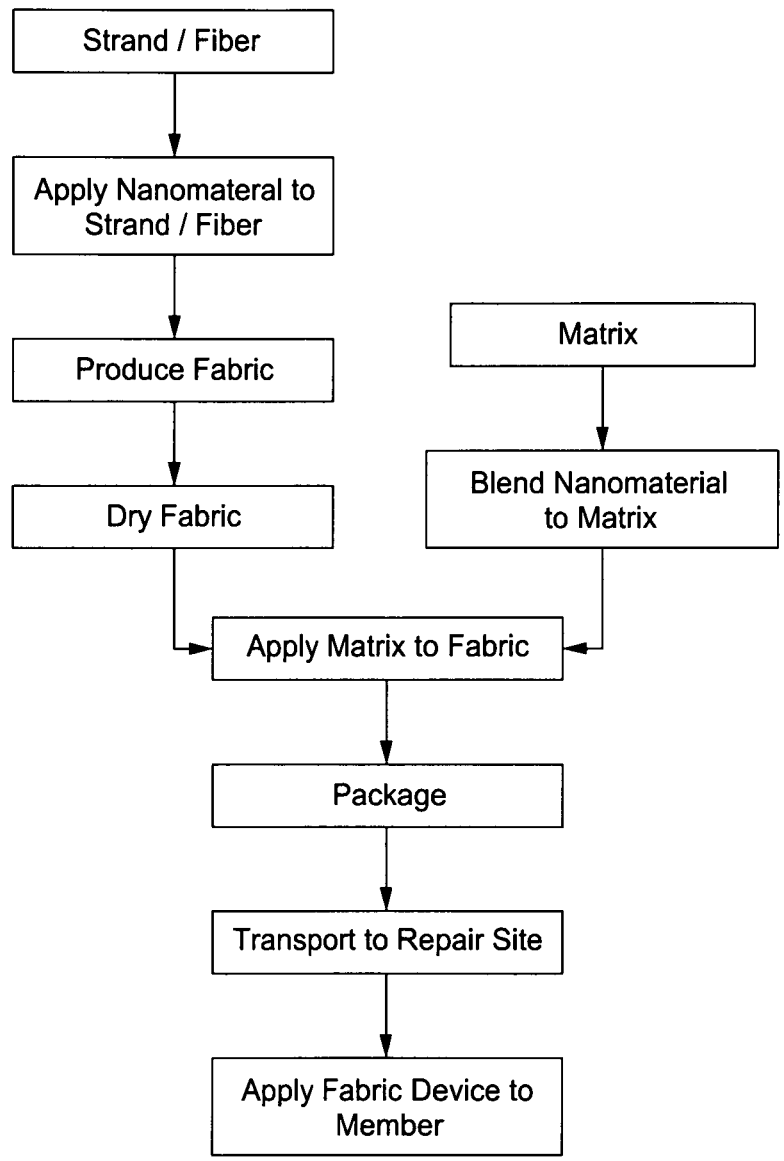
Figure 1K:
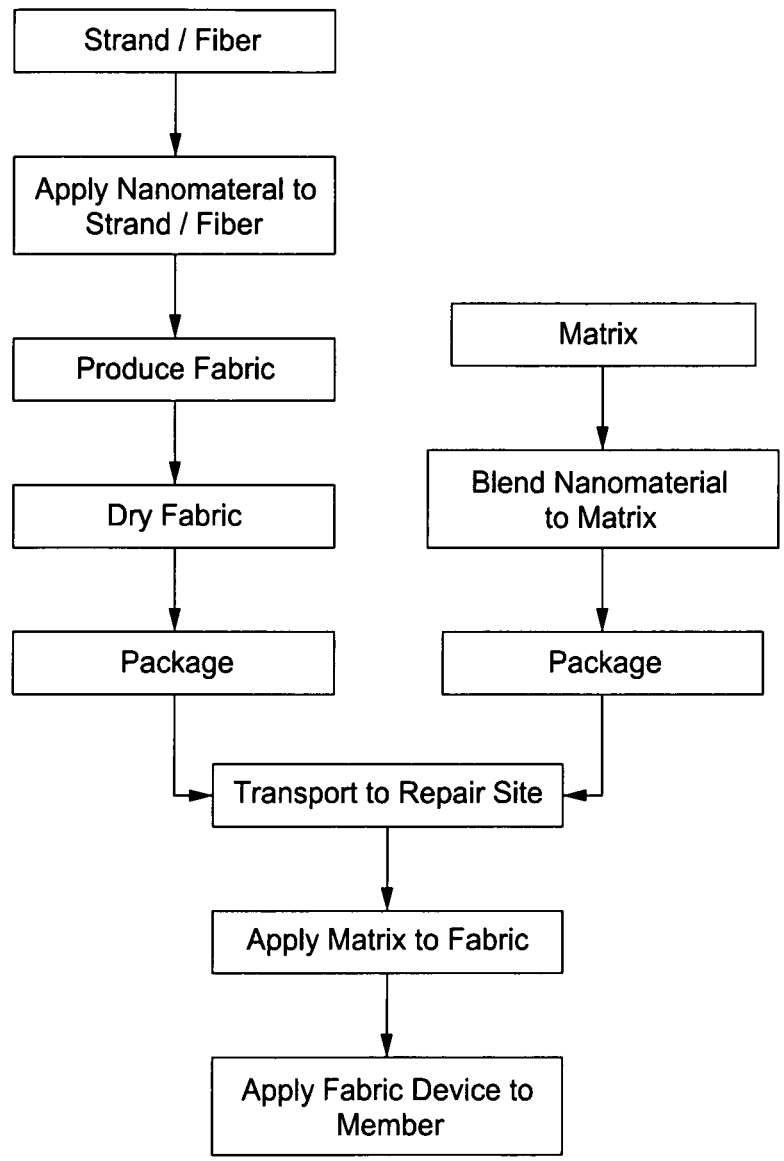

FIGS. 1H-1K illustrate methods according to the present invention (like words indicate like steps and things) in which nanomaterials are imparted onto a fiber or strand and the fiber or strand is woven into a fabric or a cloth. The fabric or cloth is then impregnated with a resin matrix to form a fabric device, and the fabric device may then be applied to a structural member to be repaired/reinforced. In certain embodiments (FIGS. 1J and 1K), the matrix may also have nanomaterials that are blended into the matrix. The matrix may be applied to the fabric to form a fabric device, and the fabric device may be packaged and shipped to the repair site where it is applied to the member to be repaired (FIGS. 1H and 1J). Alternatively, the fabric and matrix may be transported to the repair site where the matrix is applied to the fabric to form a fabric device and the fabric device is applied to the member to be repaired (FIGS. 1I and 1K).

Figure 1L:
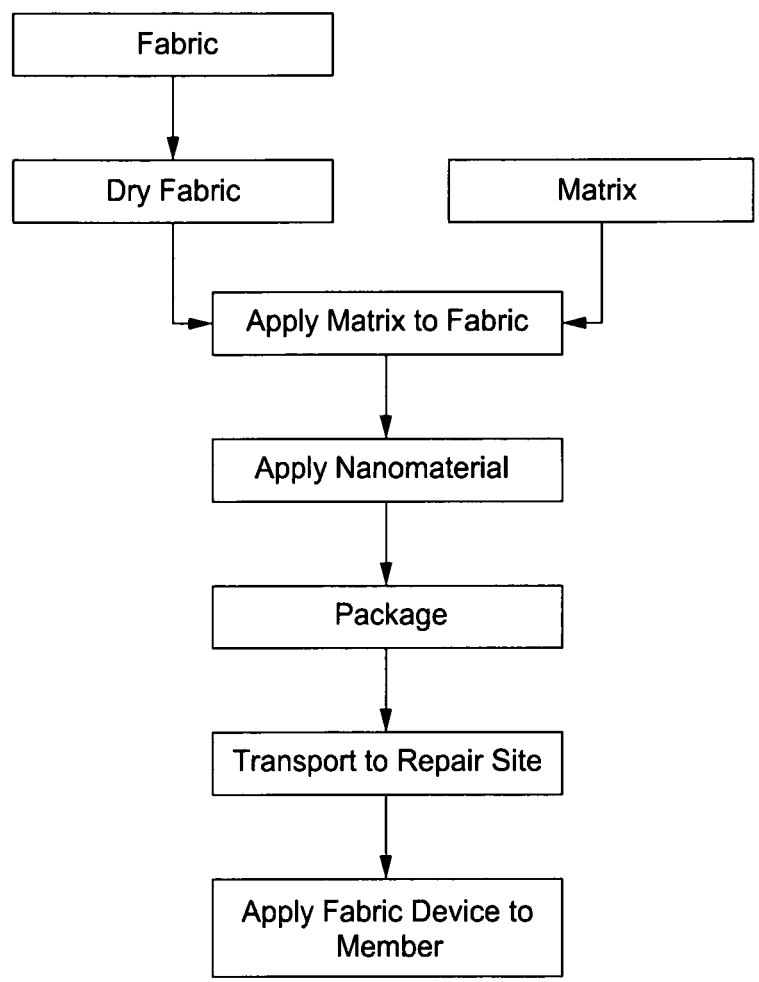
Figure 1M:
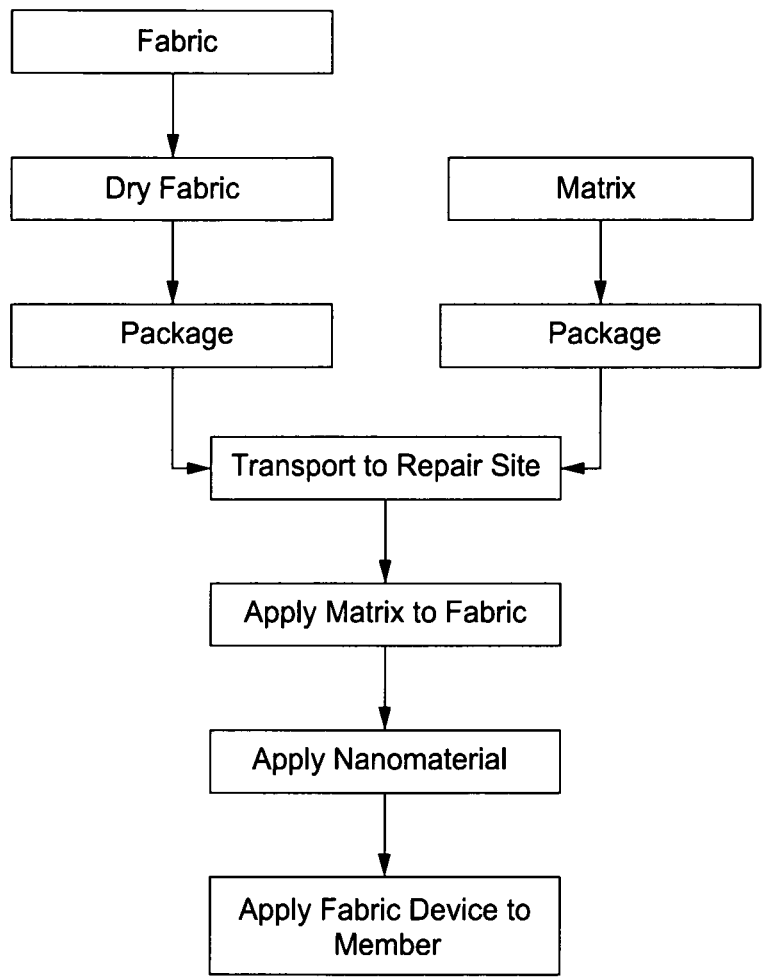

With reference to FIG. 1L, a fabric device in accordance with the present invention may be fabricated by applying a matrix to fabric at a location remote from the repair site and then applying nanomaterials to the fabric containing the matrix at the remote location. The fabric device is then packaged and transported to the repair site where it is applied to the member to be repaired. Alternatively, as illustrated in FIG. 1M, the fabric and matrix may be separately packaged and transported to the repair site. At the repair site, the matrix is applied to the fabric, and a fabric device according to the present invention is then fabricated by applying nanomaterials to the fabric containing the matrix.

The application of the matrix to fabric is done in a controlled, dry environment (in one aspect, in a dry inert gas atmosphere, e.g. using argon or nitrogen), especially if the resin used for the matrix is a moisture-curing resin. Any embodiment of a device according to the present invention may use moisture-curing resin. Dispersion of pieces of nanomaterial may, according to the present invention, be enhanced by energizing the nanomaterial prior to application, e.g. by sonication, either for nanomaterial mixed with a solvent or for nanomaterial added to a matrix.

Figure 2:
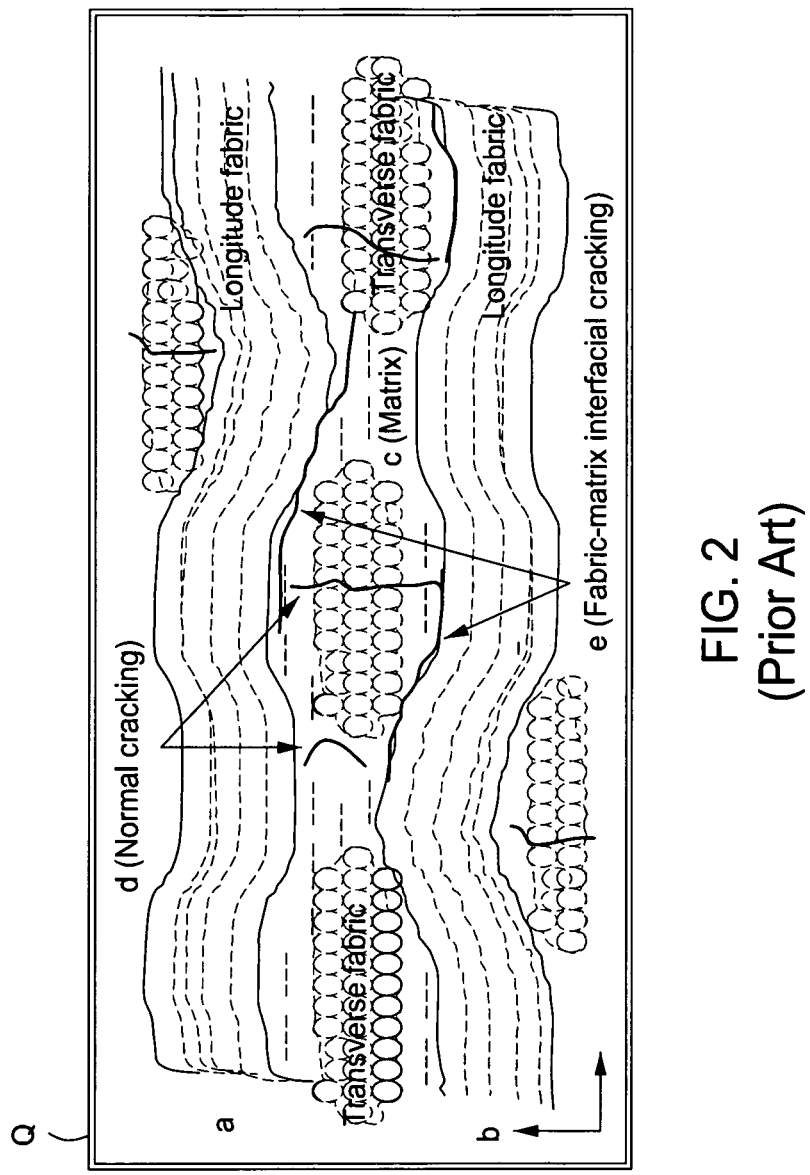
FIG. 2 is a cross-section view of a known repair device.

In devices without nanomaterial tougheners fiber/matrix interfaces do not have nanomaterial to block cracks. In such a known device, cracking starts normal to an applied load (horizontal direction) and is propagated to the fabric-matrix interface, then propagated along the interface causing delamination of the fabric and matrix. This often leads to failure of the composite. FIG. 2 shows a known repair device Q with FRP fabric layers a, b, and a matrix region c with normal cracks d and interfacial longitudinal cracks e. The interfacial cracks e are between an interface of the fabric and a matrix applied in the fabric. In known devices like the device Q longitudinal crack propagation is along a fabric-matrix interface of a fiber reinforced composite laminate. Cracks d in such a device propagate to the matrix-fabric interface and then propagate principally as longitudinal fabric-matrix interfacial cracks or as cracks in an adhesive leading to delamination in fabricated composite.

Figure 3:
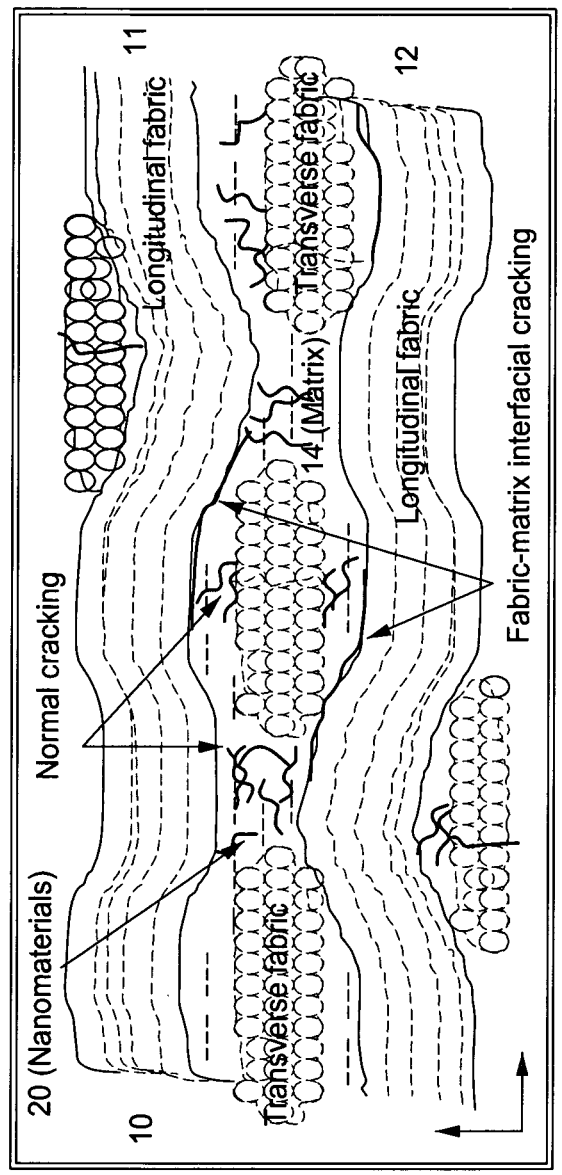
FIG. 3 is a cross-section view of a repair device according to the present invention.

When, according to the present invention, one or both surfaces of fabric are coated with nanomaterial as described above, e.g. carbon nanotubes or electro-spun fiberglass, the fabric is reinforced at its interface(s) with a matrix and cracks propagate away from the interface(s) in what is a cohesive mode that is more resistant to crack propagation than an adhesive mode (as seen in FIG. 2). FIG. 3 illustrates a fabric device 10 according to the present invention with fabric layers 11, 12 with a matrix 14 each with embedded nanomaterial; in this case, embedded carbon nanotubes 20.

In certain embodiments, in a device according to the present invention cracks behave differently after the nanomaterial is embedded. The cracks run away from the nanomaterial-reinforced fiber/matrix and do not permeate the fiber-matrix as aggressively as in prior devices because the matrix (resin) and the fibers have more strength due to the added surface area supplied by the nanomaterial. The nanomaterial delays the ability of a crack to spread farther or as quickly. The nanomaterial arrests cracks about 30% more by being present in the material. Cracks become relatively smaller and less prevalent.

Due to the presence of the nanomaterial in the device 10, the fabric/matrix interfaces are reinforced, mitigating longitudinal fabric-matrix crack growth and subsequent delamination. Crack tends to propagate in more resistant cohesive region rather than the adhesive region of the fabric-matrix interface. Normal cracks initiating in the matrix or in transverse yarn are blunted at interface.

Figure 4:
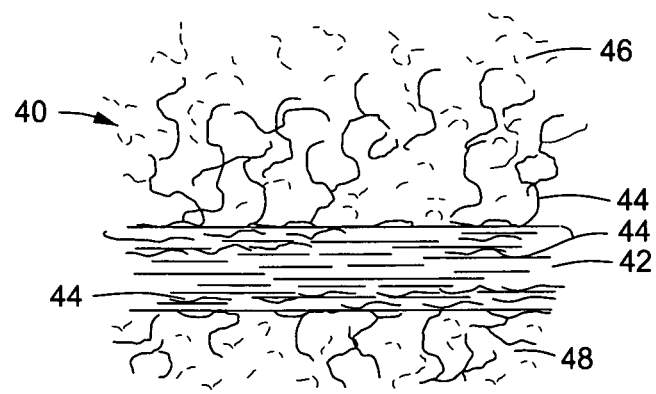
FIG. 4 is a cross-section view of a repair device according to the present invention.

FIG. 4 shows a fabric device 40 according to the present invention with fabric layers 42 toughened by the addition of functionalized or unfunctionalized nanomaterials 44 in a matrix 46. The device 40 has a toughened fabric/matrix interfacial region. Optionally, and as is true for any fabric in any embodiment of the present invention, a matrix 48 (like the matrix 46) is on a surface of the fabric layers 42 opposite that of the surface on which is the matrix 46. FIG. 4 shows that, after nanomaterials are deposited on the fabric, with some infusing of nanomaterials into the fabric and into the matrix, the matrix remains on the fabric surfaces. Some nanomaterials are dispersed from the fabric into the matrix near the fabric surface. This makes a strengthened and toughened resin around the fabric which mitigates fiber-matrix cracking and which can, in certain locations force a crack to deviate away from the regions reinforced with nanomaterials.

Figure 5:
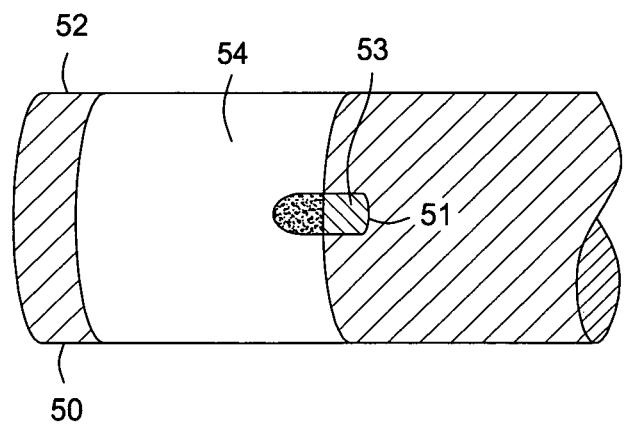
FIG. 5 is a perspective view illustrating a method according to the present invention.
Figure 6:
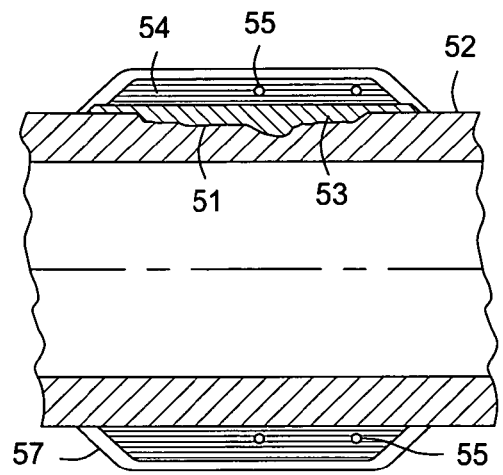
FIG. 6 is a cross-section view of part of a pipe of FIG. 5.

FIG. 5 shows a portion 52 of a pipeline 50 which has a degraded area 51. Load transfer filler material 53 which may also contain nanomaterials has been placed into the degraded area 51 (see also FIG. 6). A fabric device 54 according to the present invention is wrapped around the pipeline 50 in multiple overlapping layers to cover the filler material 53 and the degraded area 51. Wrapping is in progress as shown in FIG. 5. Optionally, the fabric device 50 includes a layer of shrink wrap material 57 (see FIG. 6) covering the fabric layers. Optionally, and as is true for any device according to the present invention, the fabric layers include a metal wire or wires 55 (see FIG. 6) for facilitating location of the repaired area, e.g. on an underground pipe or pipeline, by a detection apparatus.

Figure 7A:
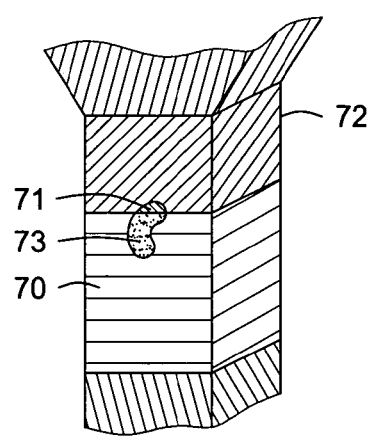
FIG. 7A is a perspective view illustrating a method according to the present invention and a structural member according to the present invention.

FIG. 7A shows a structural column 72 which has a degraded area 71. Load transfer filler material 73 which may also contain nanomaterials has been applied to the degraded area 71 and a fabric device 70 according to the present invention is being wrapped around the column in overlapping layers. Upon completion, the layers of the fabric device 70 will cover the filler material 73 and the degraded area 71.

Figure 7B:
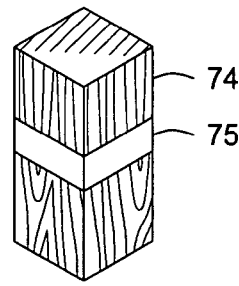
FIG. 7B is a perspective view illustrating a post according to the present invention.

FIG. 7B shows a wooden post 74 according to the present invention. A fabric device 75 according to the present invention (any disclosed herein, sized and configured as shown) has been wrapped around the post 74 to reinforce it.

Figure 7C:
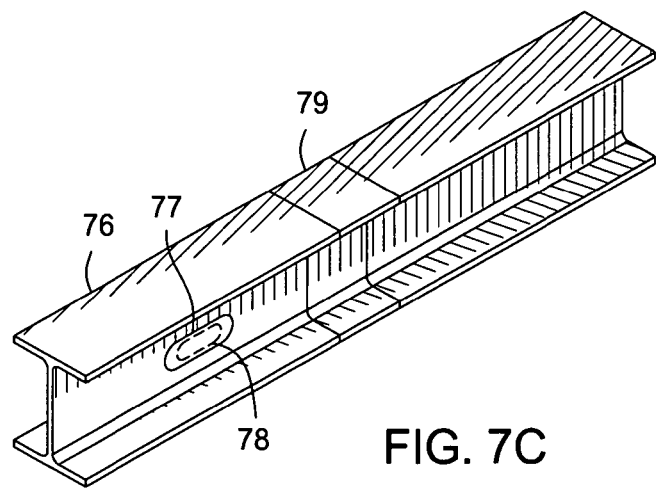
FIG. 7C is a perspective view illustrating an I-beam according to the present invention.

FIG. 7C shows a steel I-beam 76 according to the present invention. A fabric device 77 according to the present invention (any disclosed herein, sized and configured as shown) has been applied over a degraded area 78 filled with load transfer material (not shown). Another device 79 according to the present invention has been wrapped around the I-beam 76 to reinforce it. As is true for any device and method according to the present invention, adhesive may be used to facilitate the installation of the devices 75, 77 and 79 on their respective members.

Figure 8:
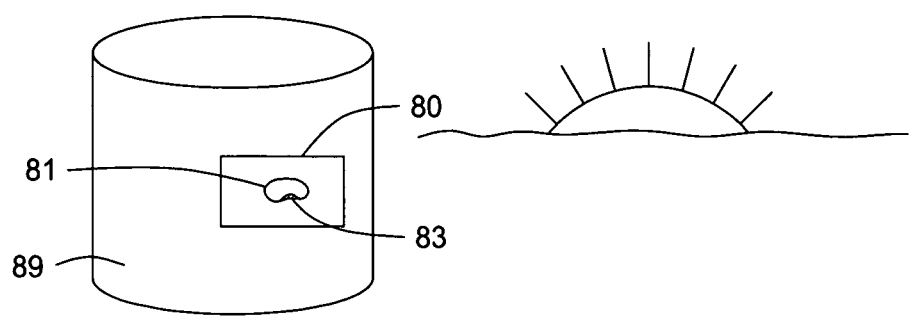
FIG. 8 is a perspective view illustrating a method according to the present invention.

FIG. 8 shows a petroleum storage tank 89 with a degraded area 81 filled with load transfer filler material 83 and covered with a fabric device 80 according to the present invention. The fabric device 80 (as is true for any embodiment herein and any repaired or reinforced member according to the present invention) does not encircle or wrap completely around the storage tank 89. The fabric device 80 is a carefully sized piece sufficiently large to cover the filler material 83 and the degraded area 81. In any embodiment of the present invention, any desired effective amount of nanomaterial may be used on fabric, typically 5% or less by weight.

In any method according to the present invention, the fabric as provided may be an amount (e.g., a piece or a roll) of fabric with resin already on the fabric (and not applied following drying). The fabric may, as described above, be wetted with the matrix, e.g. a two-part epoxy resin; or the fabric may have both parts of a two-part epoxy resin applied to it after which it is cooled or frozen to prevent resin curing. With the latter alternative, a previously-frozen device may be heated to "kick start" resin curing.

The present invention, therefore, provides in some, but not in necessarily all embodiments a fabric device for application on an area of a member, the fabric device having: at least one layer of fabric, the at least one layer of fabric having a first surface and a second surface spaced-apart from the first surface, the fabric made of composite material; nanomaterial bonded to at least one surface of the fabric; and a resin matrix on the fabric over the nanomaterial. Such methods may one or some, in any possible combination, of the following: the at least one surface is both the first surface and the second surface with nanomaterial bonded to each surface; the at least one layer of fabric is a plurality of adjacent layers of fabric and at least one surface or both surfaces of each layer has nanomaterial thereon; the nanomaterial is one of (treated or untreated) nanotubes, nanofibers, nano whiskers, graphene, nanoclays, nanowire, nanoinclusions, and bucky paper; the resin matrix is one of thermosetting resin, epoxy resin, thermoset polymer, thermoplastic polymer, and polyurethane resin; and/or nanomaterial in the resin matrix for inhibiting or stopping crack propagation.

Referring now to FIGS. 9-12. There are schematically shown systems and methods for dispersing nanoparticles into a matrix.

Figure 9A:
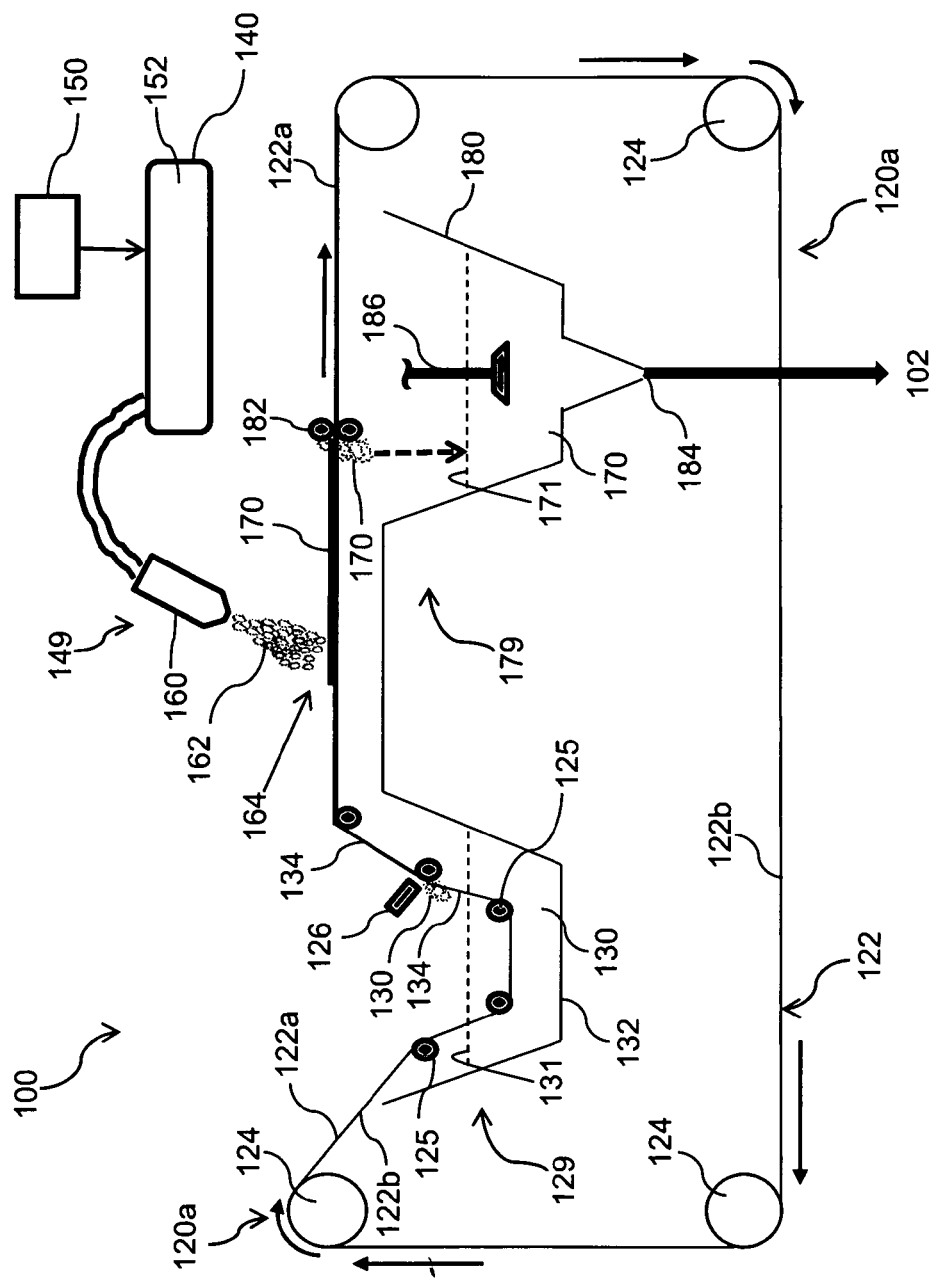
FIG. 9A schematically illustrates one method and system for dispersing nanoparticles into a matrix.

Referring to FIG. 9A, there is schematically shown a system 100 for dispersing nanoparticles into a matrix. In this first method, a continuous loop belt (or carrier film) conveyor system 120a is employed. The belt or carrier film 122 has a top side 122a and an underside 122b. Suitable guide wheels or rollers 124 are positioned to guide the belt 122 in a continuous loop. The belt 122 is driven by a motive force (not shown) such as a conveyor belt drive motor or the like, to produce movement of the belt 122 in the direction of the arrows as shown. In operation, the belt 122 is first moved through a resin coating station 129 where the belt is coated with a desired neat resin material 130, such as by directing the belt 122 into a basin, vat or other container 132 containing the neat resin material 130 (maintained at a desired neat resin level or volume 131). Suitable guide rollers or the like 125 direct the belt 122 into the resin material 130. In this configuration, coating the belt top surface 122a is required, and coating the belt underside 122b is not required (but will occur as a result of submerging the belt 122 into the neat resin material 130). Alternatively, the neat resin material 130 could be applied to the belt top surface 122a using a suitable dispensing applicator (not shown) that directs the neat resin onto the belt top surface 122a.

The neat resin itself is a desired "A" Component or base matrix material of, for example, a two-component system, that will ultimately be used to create a hardened, nanoparticle-impregnated layer when exposed to the curing agent or "B" (second) Component of the two component system.

As the neat resin-coated belt 122 emerges from the vat 132 (or, alternatively, after the belt top surface 122a is coated with the neat resin 130 via other coating techniques), the thickness of the resin coating or layer 134 may be adjusted, if necessary, to a desired thickness using a suitable technique. For example, the belt 122 may be directed through an impingement or fixed-height scraper or doctored blade mechanism 126 to squeeze or scrape off excess neat resin 130 from the belt top surface 122a so that a fine layer (of a desired thickness) of neat resin 134 remains on the belt top surface 122a. For example, it is contemplated that the resulting a resin layer 134 be of a thickness of between 0.001" and 3.500", and more preferably of a thickness less than ½ inch, but in any event, in a suitable thickness for receiving a dispersion of nanoparticles. The neat resin material 130 that is removed from the belt top surface 122a can then be recycled or reused by, e.g., returning it to the vat 132. In the configuration shown in FIG. 1, the recycled neat resin material 130 removed by scraper 126 is permitted to flow/fall back into the vat 132.

The system 100 also includes a mixing chamber or reservoir 140 for receiving nanoparticles 150 and mixing them into a solution of suspended nanoparticles 152.

Ideally, the nanoparticles 150 that are introduced into the mixing chamber 140 are first functionalized to enhance covalent bonding to a resin matrix as required or otherwise desired. For example a carboxylic acid group (—COOH) or alcohol group (—OH) can be employed where a moisture-cured polyurethane will be employed, or a fluorinated group could be used for an epoxy system. Berger (2008) describes that functionalization of carbon nanotubes is key to electro-chemical nanotechnology devices, such teachings being incorporated herein by reference. See also Balasubramanian and Burghard (2005) for an example review of chemically functionalized carbon nanotubes. As such, depending on the final matrix or compound to be employed, attachment of appropriate functional groups to the sidewalls of the nanoparticles (via the process of functionalization or rational functionalization) can assist in making the nanoparticles more easily dispersible in liquids. Numerous functionalized nanoparticles are commercially available.

The systems and methodologies described herein can advantageously be used with any nanoparticles or functionalized nanoparticles.

In the present system 100, the preferably functionalized nanoparticles 150 in the mixing chamber or reservoir 140 are suspended in suitable solvents, such as water or in a surfactant to create suspended nanoparticles 152. The suspension fluid type is dependent upon the functionalization group and the corresponding matrix for the nanoparticle. The suspension method may be achieved, for example, through the use of a sonicator as the reservoir 140 containing the suspended particles is replenished with nanoparticles and solvent/surfactant as required to maintain a supply of the suspended nanoparticle solution 152.

The suspended nanoparticles 152 are then directed (via, e.g., pump not shown) from the mixing reservoir 140 to a spray head or nozzle/atomizer 160 that is directed toward the belt or carrier film top surface 122a. The suspended nanoparticles 152 are sprayed by a defined pattern 162 with a controlled fluid flow rate such that atomization occurs which thus causes rapid evaporation or "flashing off" of the solvent". The spray 162 containing nanoparticles is directed at the "A" Component or base matrix material 134 that is on the carrier film 122. The carrier film 122 is preferably made of, but not limited to, polyester, silicone, polyethylene, etc. It is preferred that the carrier film top surface 122a possess surface properties (e.g., slickness, non-stick, etc.) that will permit the later removal of the base matrix from the film top surface 122a. The matrix layer 134 is a reasonably thin film (i.e., preferably less than ½ inch thick) on the carrier film or belt top surface 122a which is traveling at a controlled travel speed of preferably less than 10 ft per second. As the matrix layer 134 passes from the resin coating station 129 into the nanoparticle deposition station 149 the layer 134 is introduced into the nanoparticle-deposition zone 164 proximate the atomization nozzle 160, the "solvent-free" functionalized nanoparticles exit the atomization nozzle at a given velocity and a wide spray pattern and become impinged onto the matrix component layer 134 to create a nanoparticle-impregnated resin matrix layer 170 traveling along the carrier film top surface 122a.

The nanoparticle-infused matrix layer 170 then travels (on top of carrier film 122a) to the end product collection station 179 having a collection vat or bath 180 where the nanoparticle-impregnated matrix layer 170 is removed from the carrier film 122 and collected in the collection vat 180 to a desired level or volume 171. For example, the carrier film 122 containing the matrix layer 170 could be directed through one or more closely spaced rollers or impingement devices 182 that cause the layer 170 to slough off or otherwise be scraped off into collection vat 180. The collection vat 180 utilizes a low speed agitator 186 or other suitable stirring mechanism to mix the collected nanoparticle-infused resin matrix layer 170 to ensure that stratification of the nanoparticles does not occur. Preferably, the stirring in the bath 180 is continuous. The carrier film or belt 122 continues in its loop to again return to the resin vat 132 where the process can start again.

The collected nanoparticle infused resin materials 170 can then be discharged from the collection vat 180 via discharge port 184 for desired application 102, wherein the resin component 170 (containing the uniformly dispersed nanoparticles) will then be combined with or otherwise exposed to the matrix catalyzer "B" Component (not shown) as required for the curing process to create a hardened matrix or compound containing uniformly dispersed nanoparticles. As such, the apparatus and associated methodology depicted in FIG. 9A provides an advantageous method for creating an "A" Component or base matrix material having nanoparticles uniformly dispersed therethrough for use in, e.g., any application requiring use of a two component hardening system.

Figure 9B:
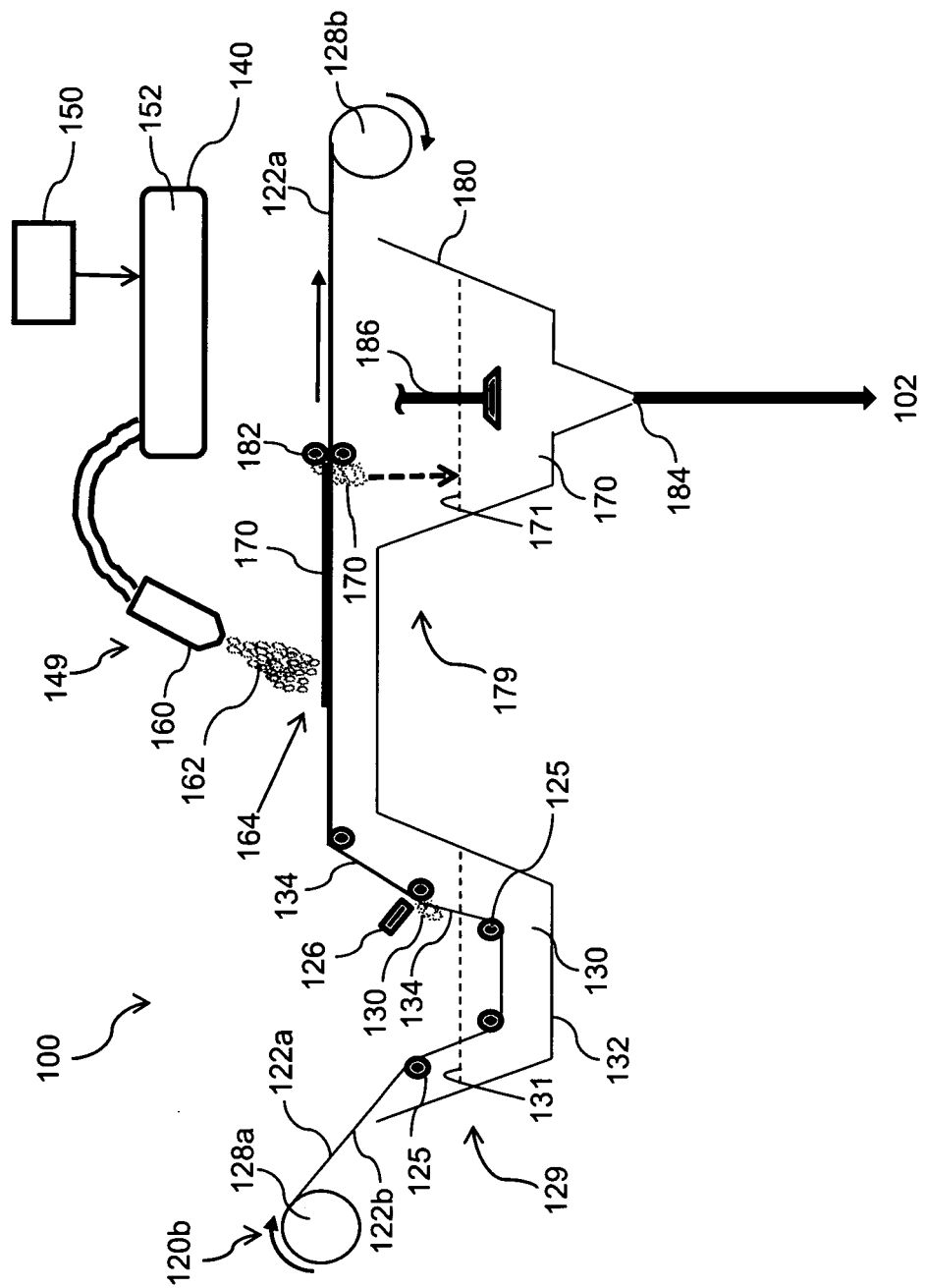
FIG. 9B schematically illustrates an alternative method and system for dispersing nanoparticles into a matrix similar to that illustrated in FIG. 9A.

Although the system of FIG. 9A illustrates the carrier film 122 moving in a continuous loop, it will be apparent to one of ordinary skill in the art having the benefit of the present disclosure that the carrier film could be passed through the system in a non-continuous loop carrier film conveyor system 120b fashion as illustrated in FIG. 9B, e.g., in a single pass-through mode. In FIG. 9B, the carrier film 122 can be dispensed from a carrier film dispensing spool or roller 128a and fed into the neat resin vat 132 as described in connection with FIG. 9A. At the other end of the system, the carrier film 122 can be collected on a carrier film receiving spool or roller 128b for reuse (for example, to serve as the carrier film dispensing spool 128a) or other handling. As will also be understood, once empty, the carrier film dispensing spool 128a could be moved to serve as the carrier film receiving spool 128b. It will also be understood that the carrier film conveyor system 120b is driven by suitable motive forces, e.g., spool 128b could be motor driven, etc.

There are therefore many uses for a material containing uniformly-dispersed nanoparticles or CNTs. Among the many examples, one exemplary use for the product 170 of such system 100 would be for pipe repair where the nanoparticle-infused matrix material 70 must be applied in a soft, gel-like, putty-like or other non-hardened fashion and then cured in place upon exposure to the curing agent. For example, Pipe Wrap LLC (Houston, Tex., www.piperepair.net) offers one pipe repair system, called PIPE WRAP® that employs an epoxy putty that is physically applied to plug the leak. After application of the putty, a fiber reinforced cloth tape, soaked in water, is wrapped around the leak area. The water activates the curing agent and the cloth holds the putty in place providing for a simple, pipe repair solution. The putty of this existing PIPE WRAP® system could be impregnated with uniformly-dispersed nanoparticles (using methods described herein) to enhance the strength of the repair.

Figure 10A:
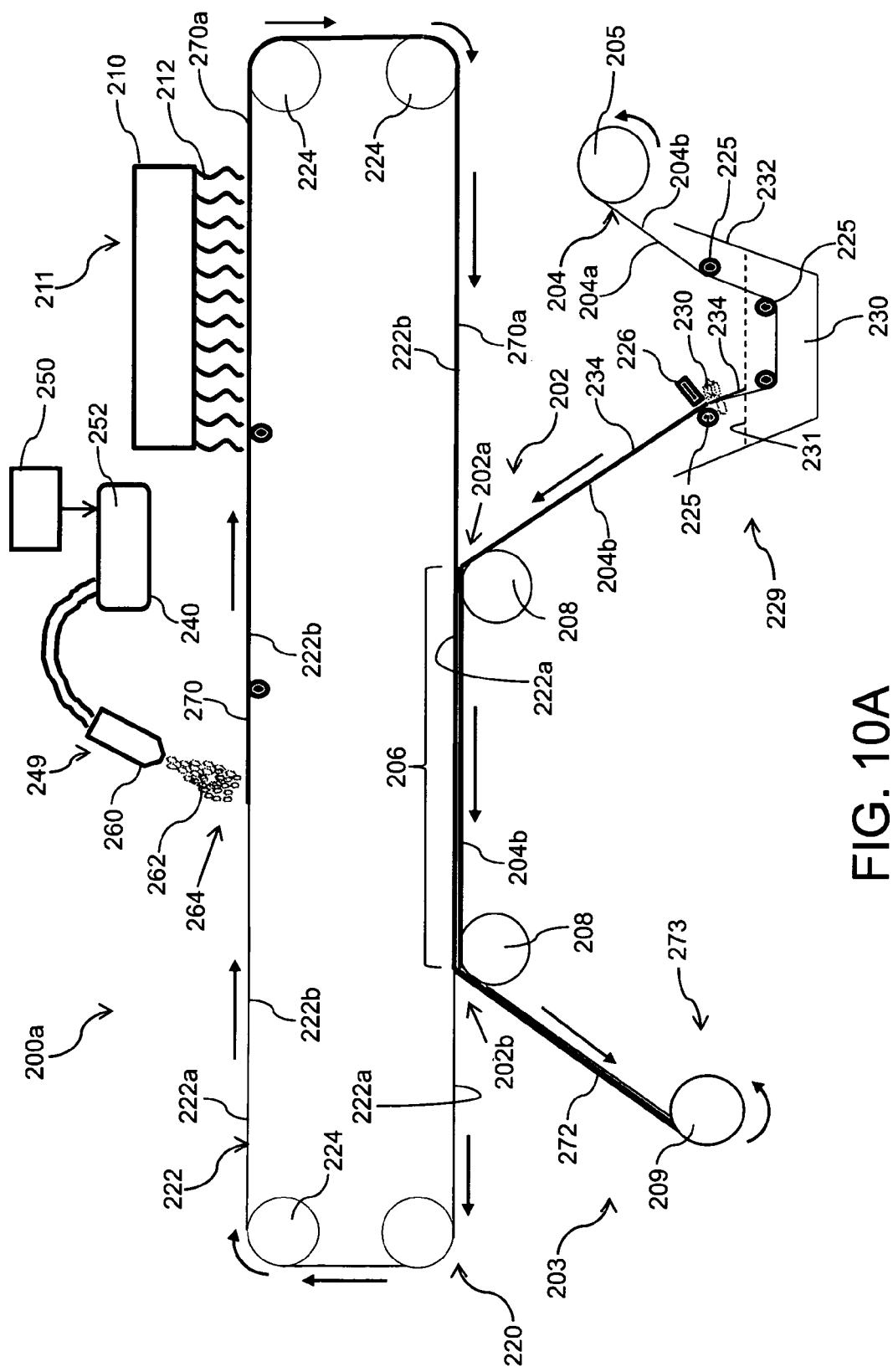
FIG. 10A schematically illustrates another method and system for dispersing nanoparticles into a matrix.

Referring to FIG. 10A, there is schematically shown a second method for dispersing nanoparticles into a matrix. Referring to FIG. 10A, there is schematically shown a system 200a for dispersing nanoparticles into a matrix. In this second method, similar to the embodiment described in connection with FIG. 9A, a continuous loop belt (or carrier film) conveyor system 220 is employed. The belt or carrier film 222 has a top side 222a and an underside 222b. Suitable guide wheels or rollers 224 are positioned to guide the belt 222 in a continuous loop. The belt 222 is driven by a motive force (not shown) such as a conveyor belt drive motor or the like, to Produce movement of the belt 222 in the direction of the arrows as shown.

The system 200 also includes a mixing chamber or reservoir 240 for receiving nanoparticles 250 and mixing them into a solution of suspended nanoparticles 252. As with the embodiment of FIG. 9A, ideally, the nanoparticles 250 that are introduced into the mixing chamber 240 are first functionalized to enhance covalent bonding to a resin matrix as required or otherwise desired. As such, depending on the final matrix or compound to be employed, attachment of appropriate functional groups to the sidewalls of the nanoparticles (via the process of functionalization or rational functionalization) can assist in making the nanoparticles more easily dispersible in liquids.

In the present system 200a, the preferably functionalized nanoparticles 250 in the mixing chamber or reservoir 240 are suspended in suitable solvents, such as water or in a surfactant to create suspended nanoparticles 252. The suspension fluid type is dependent upon the functionalization group and the corresponding matrix for the nanoparticle. The suspension method may be achieved, for example, through the use of a sonicator as the reservoir 240 containing the suspended particles is replenished with nanoparticles and solvent/surfactant as required to maintain a supply of the suspended nanoparticle solution 252.

The suspended nanoparticles 252 are then directed (via, e.g., pump not shown) from the mixing reservoir 240 to a spray head or nozzle/atomizer 260 that is directed toward the belt or carrier film top surface 222a. The suspended nanoparticles 252 are sprayed by a defined pattern 262 with a controlled fluid flow rate such that atomization occurs which thus causes rapid evaporation or "flashing off of the solvent". In this nanoparticle deposition step (taking place in the nanoparticle deposition zone 264 of the nanoparticle deposition station 249), the spray 262 containing nanoparticles is directed to the carrier film top surface 222a. The carrier film 222 is preferably made of, but not limited to, polyester, silicone, polyethylene, etc. It is preferred that the carrier film top surface 222a possess surface properties (e.g., slickness, non-stick, etc.) that will permit the later removal of the dispersed nanoparticles from the film top surface 222a. The carrier film or belt top surface 222a is traveling at a controlled travel speed of preferably less than 10 ft per second. As the carrier film top surface 222a passes proximate the atomization nozzle, the "solvent-free" functionalized nanoparticles exit the atomization nozzle at a given velocity and a wide spray pattern and become impinged onto the carrier film top surface 222a to create a nanoparticle-impregnated layer 270 traveling along the carrier film top surface 222a.

The carrier film surface 222a containing the nanoparticles 270 may then be directed into a heating section 211, such as a heating chamber 210 or otherwise passed under a heat source so that heat 212 can further dry the nanoparticles 270 to create a dried nanoparticle-infused layer 270a. The impingement process enables the nanoparticles to adhere to the carrier film. For example, the carrier film 222*a* may comprise a soft membrane such as silicone. The spray force 262 causes the nanoparticle to slightly embed into the film 222*a*. The heating step evaporates any solvents used to suspend the nanoparticle during the spray mixture. In one embodiment, the nanoparticles are held in place on the carrier film surface 222*a* by Van der Waals forces. Although the carrier film 222*a* path is shown with substantially horizontally-oriented sections and substantially vertically-oriented sections, the carrier film 222*a* path could travel from the point of the nanoparticle deposition zone 264 to the transfer segment 202 in a way that did not require the carrier film 222*a* to deviate from horizontal orientation.

As such, at this stage of the process, the carrier film top surface 222*a* has been coated with a uniform layer of evenly dispersed nanoparticles. The carrier film 222 (containing the layer of nanoparticles) is then directed to a transfer operation section 202.

Transfer operation section 202 merges together the carrier film upper surface 222*a* (containing the uniformly dispersed layer of nanoparticles 270) with another resin coated fabric layer 204 located in the fabric section 203.

Much like with FIG. 9A, in operation, the fabric layer 204 (which may be contained on a spool 205 or the like) is first coated with a neat resin material 230 in the resin coating station 229, such as by directing the fabric layer 204 into a basin, vat or other container 232 containing the neat resin material 230 (at a desired level or volume 231). Suitable guide rollers or the like 225 direct the fabric layer 204 into the resin material 230. In this configuration, coating the fabric layer top surface 204*a* is required, and coating the fabric layer underside 204*b* is not required (but will occur as a result of submerging the fabric layer 204 into the neat resin material 230). Alternatively, the neat resin material 230 could be applied to the fabric layer top surface 204*a* using a suitable dispensing applicator (not shown) that directs the neat resin 230 onto the fabric layer top surface 204*a*. Ideally, the width of the fabric 204 is approximately the same as the width of the carrier film 222.

Much like with the embodiment of FIG. 9A, the neat resin itself may be a desired "A" Component or base matrix material of, for example, a two-component system, that will ultimately be used to create a hardened, nanoparticle-impregnated layer when exposed to the curing agent or "B" (second) Component of the two component system.

The fabric is directed through the system 200*a* via a series of rollers 208, 225, 205, and the final product is directed into a nanoparticle-infused resin fabric collection system 273 where, e.g., the end product may be spooled on a collection spool 209. Other mechanisms for directing the fabric through the system will be apparent to those of ordinary skill in the art having the benefit of the present disclosure. For example, collection spool could be motorized by motor (not shown). As will be understood, the speed of the fabric section 203 is coordinated with the speed of the belt conveyor system 220.

As the neat resin-coated fabric 204 emerges from the vat 232 (or, alternatively, after the fabric layer top surface 204*a* is coated with the neat resin 230 via other coating techniques), the thickness of the resin coating or layer 234 may be adjusted, if necessary, to a desired thickness using a suitable technique. For example, the fabric 204 may be directed through an impingement or fixed-height scraper or doctored blade mechanism 226 to squeeze or scrape off excess neat resin 230 from the fabric top surface 204*a* so that a fine layer (of a desired thickness) of neat resin 234 remains on the fabric top surface 204*a*. For example, it is contemplated that the resulting a resin layer 234 be of a thickness of between 0.001" and 3.500", and more preferably of a thickness less than ½ inch, but in any event, in a suitable thickness for receiving a dispersion of nanoparticles 270 from the belt 222. The neat resin material 230 that is removed from the fabric top surface 204*a* can then be recycled or reused by, e.g., returning it to the vat 232. In the configuration shown in FIG. 10A, the recycled neat resin material 230 removed by scraper 226 is permitted to flow/fall back into the vat 232.

The uniformly dispersed nanoparticle layer 270 enters the transfer operation section 202 at the entrance 202a where the layer 270 comes into contact with the fabric layer top side 204a containing the layer of neat resin material 234. The layer 270 remains in contact with the resin material 234 on the cloth 204 through a contact zone 206 to thereby transfer the uniformly dispersed nanoparticles 270 from the carrier film 222 into the resin layer 234 on fabric 204 to create a nanoparticle-impregnated resin cloth product 272 that can be collected for later use, by, e.g., spooling it onto a collection spool or core 209. In one embodiment, a series of rollers (not shown) are used to squeeze, press or compress together the layers 204a/234 with 222a/270 to transfer the nanoparticle layer 270 onto the resin layer 234 of the fabric 204. In effect, the nanoparticle layer 270 is sandwiched with the resin layer 234 between the fabric layer 204 and the carrier belt 222. The transfer operation section is capable of receiving the nanoparticle-coated carrier film 222 and the resin-coated fabric layer 204 and passing both through the contact zone 206 so that the top side of the carrier film 222a containing the nanoparticles 270a is in contact with the top side 204a of the resin-coated fabric layer 204 to thereby permit the nanoparticles on the carrier film to be transferred to the resin-coated fabric layer to create a nanoparticle-infused resin fabric product 272.

Final placement of nanoparticles requires a pre-impregnated composite material with a resin matrix to be pressed or compressed together with the carrier film having the pre-processed nanoparticles from the nanoparticle deposition step. The pressing action will cause the nanoparticles to transfer from the carrier film to the pre-impregnated composite material. The pre-impregnated composite with nanoparticles is spooled/packaged for later use while the carrier film is recycled for the nanoparticle deposition step. The pre-impregnated composite product with nanoparticles can then be used in any desired application, wherein the product will then be combined with or otherwise exposed to the curing agent required for the curing process to create a hardened matrix or compound containing uniformly dispersed nanoparticles. As such, the apparatus and associated methodology depicted in FIG. 10A provides an advantageous method for creating an "A" Component or base matrix material having nanoparticles uniformly dispersed therethrough for use in, e.g., any application requiring use of a two component curable hardening system.

Figures 1, 2, 10B:
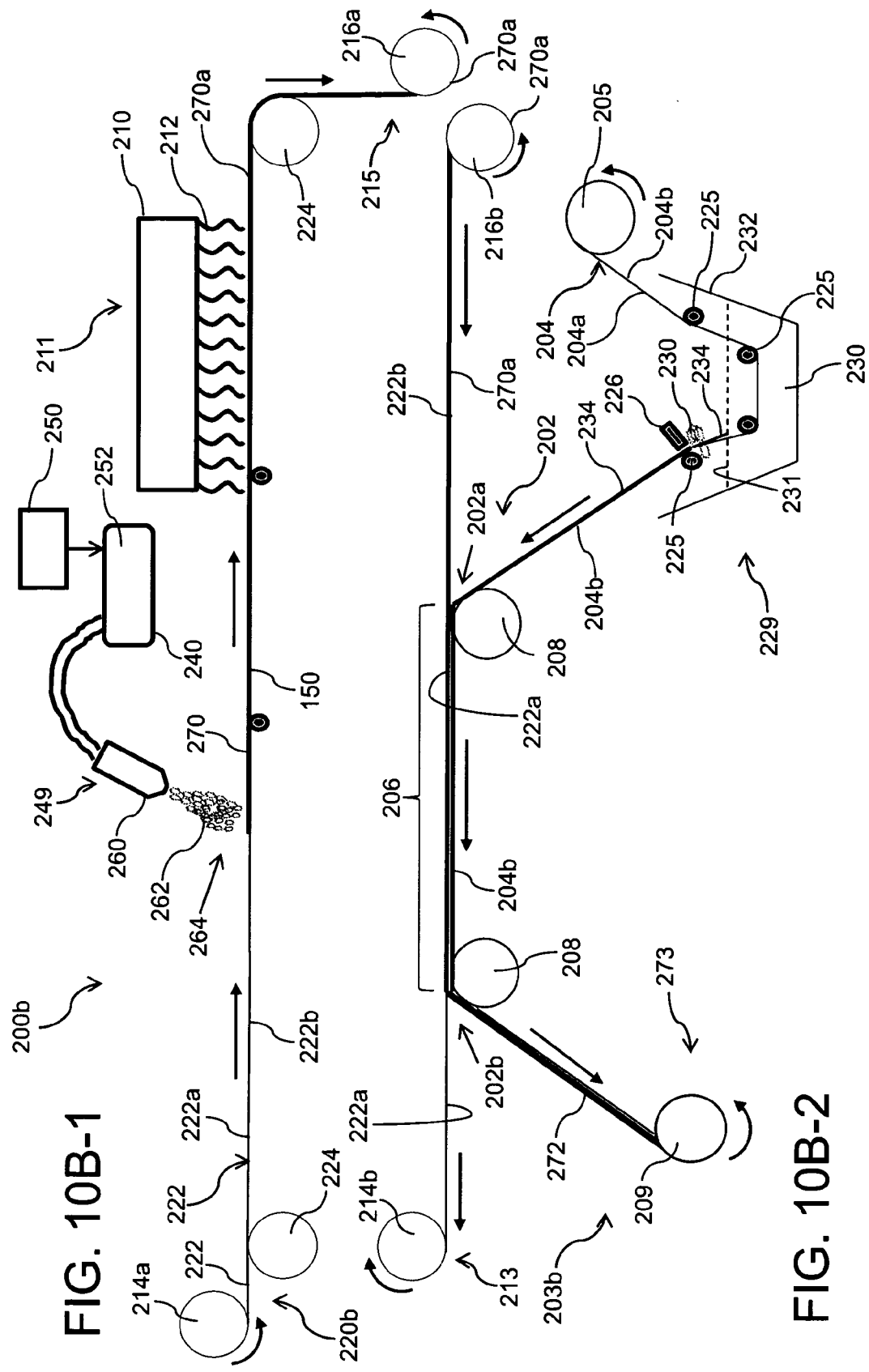
FIG. 10B-1 schematically illustrates a variation of the method and system for dispersing nanoparticles into a matrix shown in FIG. 10A.

Although FIG. 10A illustrates the carrier film 222 being conveyed as a continuous loop system 220, the nanoparticle dispersing system 200a of FIG. 10A could be, for example, split into two sections as illustrated in FIGS. 10B-1 and 10B-2. Referring to FIG. 10B-1 and FIG. 10B-2, the nanoparticle dispersing system 200b operates with two independent sections: a nanoparticle deposition section 220b (FIG. 10B-1) for depositing a uniformly dispersed nanoparticle layer 270a onto the carrier film top surface 222a; and a fabric integration section 203b (FIG. 10B-2) for integrating the nanoparticle layer 270a from the carrier film 222 onto a fabric layer 204 to create a nanoparticle-infused resin cloth product 272. In this embodiment, referring to FIG. 10B-1, carrier sheet 222 (dispensed from a spool or roll 214a) is fed into nanoparticle deposition station 249 and into the nanoparticle deposition zone 264 as in FIG. 10A (using motive mechanisms, such as motorized conveyors and the like). The dried nanoparticle-infused layer 270a can then be collected on a nanoparticle-infused layer collection spool 216a in the carrier film end product collection station 215 for further use. The collected nanoparticle-infused layer 270a can then be dispensed from a spool 216b into the transfer section 202.

As will be appreciated, the collection spool 216a can later become the dispensing spool 216b. The nanoparticle-infused layer 270a (on carrier sheet 222) is then fed into the transfer operation section entrance 202a as in FIG. 10A (using motive mechanisms, such as motorized conveyors and the like). The thus-formed nanoparticle-infused resin cloth product 272 is collected as in FIG. 10A onto a collection spool 209. The carrier sheet 222 can then be collected in a carrier film collection section 213 on, e.g., a collection spool 214b. As will be appreciated, the carrier sheet collection spool 214b can later become the carrier sheet dispensing spool 214a.

There are therefore many uses for a cloth/fabric-based wrap material containing uniformly-dispersed nanoparticles or CNTs. Among the many examples, one exemplary use for the nanoparticle-infused resin cloth product 272 of such system 200 would be for pipeline repair or remediation where the nanoparticle-infused matrix material 272 can be applied as a wrap and then cured in place upon exposure to the curing agent. For example, in one embodiment, the fabric with neat resin layer 234 is glass fiber reinforced fabric that is factory impregnated with durable, moisture cured polyurethane (MCU) resins (much like shown in FIG. 10A where cloth 204 is dipped in un-catalyzed resin 230). An exemplary resin-impregnated fabric is the A+WRAP™ product (also referred to as "PWAP") provided by Pipe Wrap LLC (Houston, Tex., www.piperepair.net) employing a MCU resin. In this embodiment, the PWAP cloth becomes enhanced by having integrated therein uniformly dispersed nanoparticles. One application is to use this enhanced, nanoparticle-enhanced PWAP product to repair or reinforce pipelines. To do so, the surface of the pipe is prepared (if desired) by abrasive blast, disk grinding, wire wheel or other techniques. An epoxy primer/undercoating is then applied to the pipe in the section (prepared area) to be repaired. The enhanced PWAP material is then tightly wrapped over the primer coating on the pipe surface section to be repaired or reinforced. The wrapped layer is then sprayed with water as a catalyst to react with the un-catalyzed resin, and the layering/watering steps are repeated until the area is covered. A final layer of a constrictor wrap is then applied to bind and tighten the wrapped area until cured. The water that is applied to the wrap during the application is the catalyst that causes the resin to react. Other suitable resin-impregnated fabrics employ a water-catalyzed epoxy.

As such, for example, although FIGS. 10A and 10B-2 show the process of dipping the fabric or cloth 204 into the resin 230, it will be understood that a spool or other feed source of pre-fabricated resin-impregnated cloth, such as the PWAP material noted above, could be fed directly into the contact zone 206 to permit transfer of the nanoparticle-infused layer 270a into the resin layer 234 of the pre-fabricated resin-impregnated cloth to create the thus-formed nanoparticle-infused resin cloth product 272.

Figure 11:
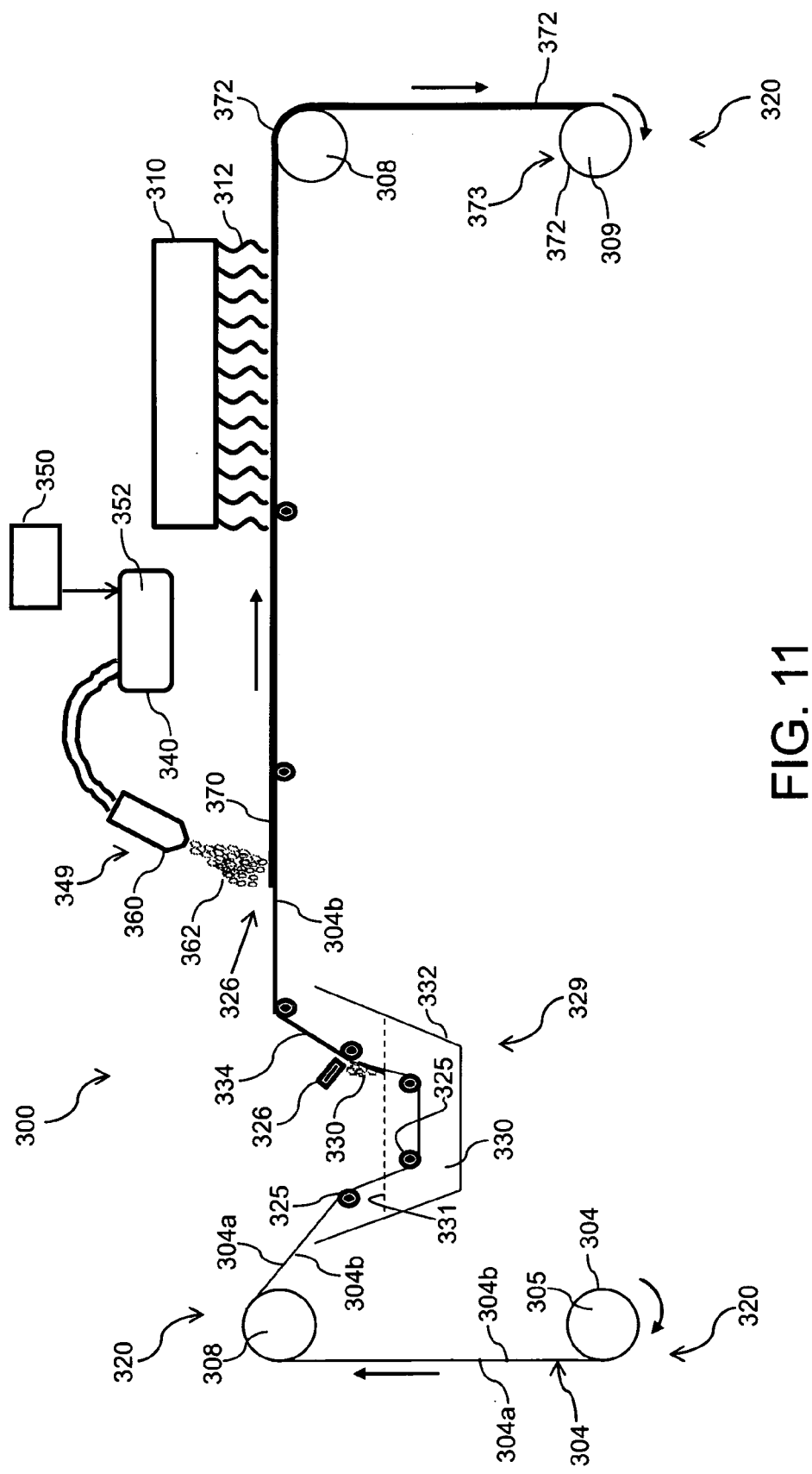
FIG. 11 schematically illustrates yet another method and system for dispersing nanoparticles into a matrix.

Referring now to FIG. 11, there is schematically shown a third method and system 300 for dispersing nanoparticles into a matrix. In this third method, similar to the embodiment described in connection with FIG. 9A, a fabric layer conveyor system 320 is employed. A length of fabric layer 304 (contained on, e.g., a spool 305) from the fabric section 302 is conveyed through the system 300 using, e.g., rollers or guide wheels 308 or the like. The fabric layer 304 has a top side 304a and an underside 304b. The fabric layer 304 is conveyed by a motive force (not shown) such as a conveyor belt drive motor or the like, to produce movement of the fabric layer 304 in the direction of the arrows as shown. In operation, the fabric layer 304 is first coated with a neat resin material 330, such as by directing the fabric layer 304 into a basin, vat or other container 332 containing the neat resin material 330. Suitable guide rollers or the like 325 direct the fabric layer 304 into the resin material 330. In this configuration, coating the fabric top surface 304a is required, and coating the fabric underside 304b is not required (but will occur as a result of submerging the fabric layer 304 into the neat resin material 330). Alternatively, the neat resin material 330 could be applied to the fabric top surface 304a using a suitable dispensing applicator (not shown) that directs the neat resin onto the fabric top surface 304a.

The neat resin itself is a desired "A" Component or base matrix material of, for example, a two-component system, that will ultimately be used to create a hardened, nanoparticle-impregnated layer when exposed to the curing agent or "B" (second) Component of the two component system.

As the neat resin-coated fabric 304 emerges from the vat 332 (or, alternatively, after the fabric top surface 304a is coated with the neat resin 330 via other coating techniques), the thickness of the resin coating or layer 334 may be adjusted, if necessary, to a desired thickness using a suitable technique. For example, the fabric layer 304 may be directed through an impingement or fixed-height scraper or doctored blade mechanism 326 to squeeze or scrape off excess neat resin 330 from the fabric top surface 304a so that a fine layer (of a desired thickness) of neat resin 334 remains on the fabric top surface 304a. For example, it is contemplated that the resulting a resin layer 334 be of a thickness of between 0.001" and 3.500", and more preferably of a thickness less than ½ inch, but in any event, in a suitable thickness for receiving a dispersion of nanoparticles. The neat resin material 330 that is removed from the fabric top surface 304a can then be recycled or reused by, e.g., returning it to the vat 332. In the configuration shown in FIG. 11, the recycled neat resin material 330 removed by scraper 326 is permitted to flow/fall back into the vat 332.

The system 300 also includes a mixing chamber or reservoir 340 for receiving nanoparticles 350 and mixing them into a solution of suspended nanoparticles 352. Ideally, the nanoparticles 350 that are introduced into the mixing chamber 340 are first functionalized to enhance covalent bonding to a resin matrix as required or otherwise desired. As such, depending on the final matrix or compound to be employed, attachment of appropriate functional groups to the sidewalls of the nanoparticles (via the process of functionalization or rational functionalization) can assist in making the nanoparticles more easily dispersible in liquids. Numerous functionalized nanoparticles are commercially available.

In the present system 300, the preferably functionalized nanoparticles 350 in the mixing chamber or reservoir 340 are suspended in suitable solvents, such as water or in a surfactant to create suspended nanoparticles 352. The suspension fluid type is dependent upon the functionalization group and the corresponding matrix for the nanoparticle. The suspension method may be achieved, for example, through the use of a sonicator as the reservoir 340 containing the suspended particles is replenished with nanoparticles and solvent/surfactant as required to maintain a supply of the suspended nanoparticle solution 352.

The suspended nanoparticles 352 are then directed (via, e.g., pump not shown) from the mixing reservoir 340 to a spray head or nozzle/atomizer 360 that is directed toward the fabric top surface 304a. The suspended nanoparticles 352 are sprayed by a defined pattern 362 with a controlled fluid flow rate such that atomization occurs which thus causes rapid evaporation or "flashing off of the solvent". The spray 362 containing nanoparticles is directed at the "A" Component or base matrix resin material 334 that is on the fabric layer 304. The matrix layer 334 is a reasonably thin film (i.e., preferably less than ½ inch thick) on the fabric top surface 304a which is traveling at a controlled travel speed of preferably less than 10 ft per second. As the matrix layer 334 passes proximate the atomization nozzle (in the nanoparticle deposition zone 364 of the nanoparticle deposition station 349), the "solvent-free" functionalized nanoparticles exit the atomization nozzle at a given velocity and a wide spray pattern and become impinged onto the matrix component layer 334 to create a nanoparticle-impregnated matrix layer 370 on the fabric top surface 304a.

The nanoparticle-infused matrix layer 370 may then be directed into a heating chamber 310 or otherwise passed under a heat source so that heat 312 can further dry the nanoparticles 370 to remove the solvent. The impingement process enables the nanoparticles to adhere to the fabric layer 304. As such, at this stage of the process, the fabric layer top surface 304a has been coated with a uniform layer of evenly dispersed nanoparticles 370 to create a nanoparticle-impregnated resin cloth product 372. The pre-impregnated composite with nanoparticles 372 is directed to the nanoparticle-infused resin fabric collection system 373 where it is spooled/packaged (e.g., on spool 309) for later use. The pre-impregnated composite product with nanoparticles 372 can then be used in any desired application, wherein the product will then be combined with or otherwise exposed to the curing agent required for the curing process to create a hardened matrix or compound containing uniformly dispersed nanoparticles. As such, the apparatus and associated methodology depicted in FIG. 11 provides an advantageous method for creating an "A" Component or base matrix material having nanoparticles uniformly dispersed therethrough for use in, e.g., any application requiring use of a two component curable hardening system.

Although FIG. 11 shows the process of dipping the fabric or cloth 304 into the resin 330, it will be understood that a spool or other feed source of pre-fabricated resin-impregnated cloth, such as the PWAP material noted above, could be fed directly into the nanoparticle deposition zone 326 to permit transfer of the nanoparticle-infused layer 370 into the resin layer 334 of the pre-fabricated resin-impregnated cloth to create the thus-formed nanoparticle-infused resin cloth product 372.

Figure 12A:
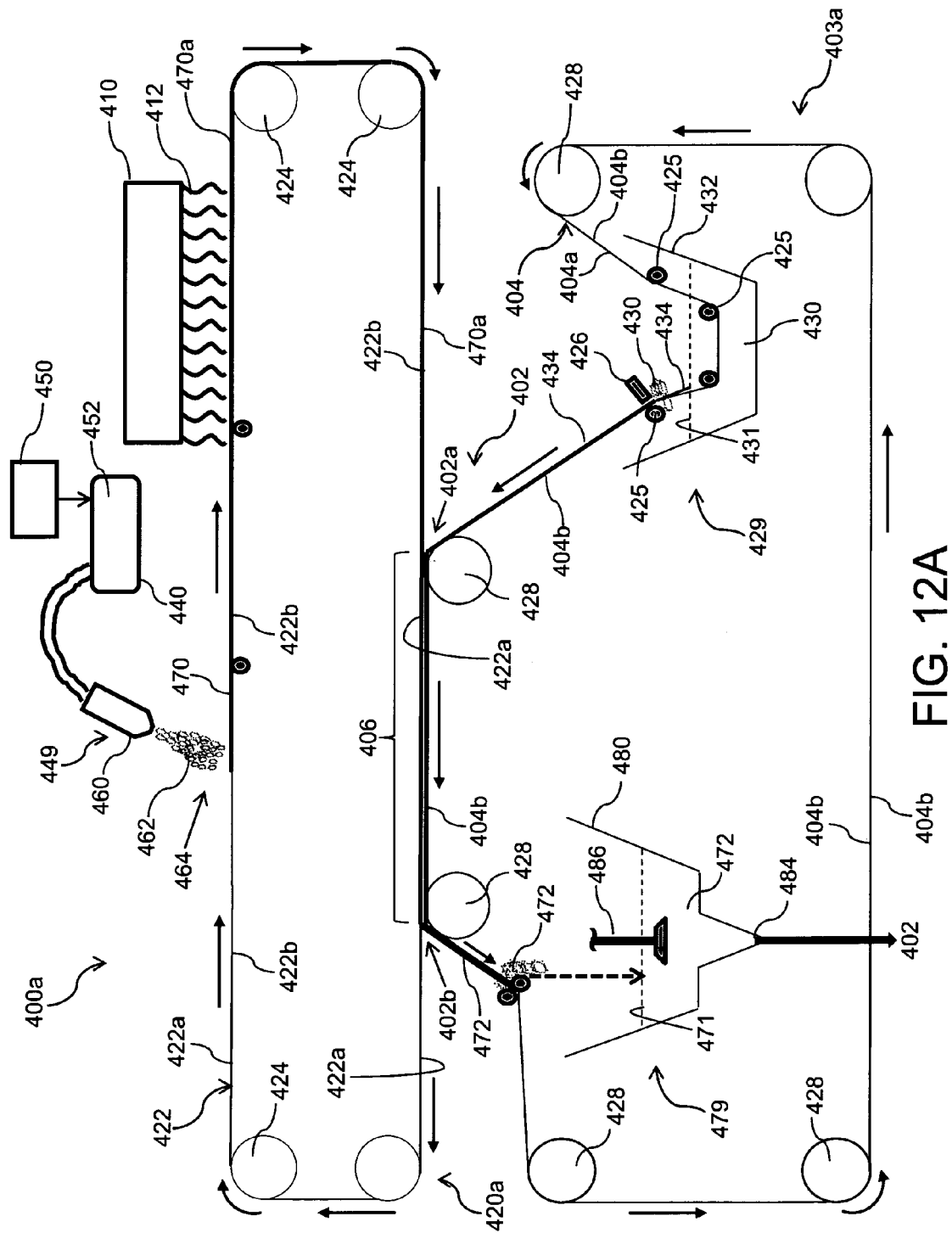
FIG. 12A schematically illustrates another method and system for dispersing nanoparticles into a matrix.

Referring to FIG. 12A, there is also schematically shown a fourth method and system 400a for dispersing nanoparticles into a matrix. In this fourth method, much like with FIG. 2A, a carrier film 422 travels in a looped belt conveyor system 420a. In this fourth method, similar to the embodiment described in connection with FIGS. 9 and 10A, a continuous loop belt (or carrier film) conveyor system 420a is employed. The belt or carrier film 422 has a top side 422a and an underside 422b. Suitable guide wheels or rollers 424 are positioned to guide the belt 422 in a continuous loop. The belt 422 is driven by a motive force (not shown) such as a conveyor belt drive motor or the like, to produce movement of the belt 422 in the direction of the arrows as shown.

The system 400a also includes a mixing chamber or reservoir 440 for receiving nanoparticles 450 and mixing them into a solution of suspended nanoparticles 452. As with the embodiment of FIGS. 9 and 10A, ideally, the nanoparticles 450 that are introduced into the mixing chamber 440 are first functionalized to enhance covalent bonding to a resin matrix as required or otherwise desired. As such, depending on the final matrix or compound to be employed, attachment of appropriate functional groups to the sidewalls of the nanoparticles (via the process of functionalization or rational functionalization) can assist in making the nanoparticles more easily dispersible in liquids.

In the present system 400*a*, the preferably functionalized nanoparticles 450 in the mixing chamber or reservoir 440 are suspended in suitable solvents, such as water or in a surfactant to create suspended nanoparticles 452. The suspension fluid type is dependent upon the functionalization group and the corresponding matrix for the nanoparticle. The suspension method may be achieved, for example, through the use of a sonicator as the reservoir 440 containing the suspended particles is replenished with nanoparticles and solvent/surfactant as required to maintain a supply of the suspended nanoparticle solution 452.

The suspended nanoparticles 452 are then directed (via, e.g., pump not shown) from the mixing reservoir 440 to a spray head or nozzle/atomizer 460 that is directed toward the belt or carrier film top surface 422*a*. The suspended nanoparticles 452 are sprayed by a defined pattern 462 with a controlled fluid flow rate such that atomization occurs which thus causes rapid evaporation or "flashing off of the solvent". In this nanoparticle deposition step (taking place in the nanoparticle deposition zone 464 of the nanoparticle deposition station 449), the spray 462 containing nanoparticles is directed to the carrier film top surface 422*a*. The carrier film 422 is preferably made of, but not limited to, polyester, silicone, polyethylene, etc. It is preferred that the carrier film top surface 422*a* possess surface properties (e.g., slickness, non-stick, etc.) that will permit the later removal of the dispersed nanoparticles from the film top surface 422*a*. The carrier film or belt top surface 422*a* is traveling at a controlled travel speed of preferably less than 10 ft per second. As the carrier film top surface 422*a* passes into the nanoparticle deposition station 449 proximate the atomization nozzle, the "solvent-free" functionalized nanoparticles exit the atomization nozzle at a given velocity and a wide spray pattern and become impinged onto the carrier film top surface 422*a* to create a nanoparticle-impregnated layer 470 traveling along the carrier film top surface 422*a*.

The carrier film surface 422*a* containing the nanoparticles 470 may then be directed into a heating chamber 410 or otherwise passed under a heat source so that heat 412 can further dry the nanoparticle layer 470 to remove any remaining solvent. The impingement process enables the nanoparticles to adhere to the carrier film. For example, the carrier film 422*a* may comprise a soft membrane such as silicone. The spray force 462 causes the nanoparticle to slightly embed into the film 422*a*. The heating step evaporates any solvents used to suspend the nanoparticle during the spray mixture. In one embodiment, the nanoparticles are held in place on the carrier film surface 422*a* by Van der Waals forces. Although the carrier film 422*a* path is shown with substantially horizontally-oriented sections and substantially vertically-oriented sections, the carrier film 422*a* path could travel from the point of the nanoparticle deposition zone 464 to the transfer segment 402 in a way that did not require the carrier film 422*a* to deviate from horizontal orientation.

As such, at this stage of the process, the carrier film top surface 422*a* has been coated with a uniform layer of evenly dispersed nanoparticles. The carrier film 422 (containing the dried nanoparticle-infused layer 470*a*) is then directed to a transfer operation section 402.

Transfer operation section 402 merges together the carrier film upper surface 422*a* (containing the uniformly dispersed layer of nanoparticles 470*a*) with another resin coated carrier film 404 located in the resin layer belt or carrier film continuous loop conveyor system 403*a*.

Resin carrier film 404 travels in a looped belt conveyor system 403*a*. The belt or carrier film 404 has a top side 440*a* and an underside 440*b*. Suitable guide wheels or rollers 428 are positioned to guide the belt 404 in a continuous loop. The belt or carrier film 404 is driven by a motive force (not shown) such as a conveyor belt drive motor or the like, to produce movement of the belt 404 in the direction of the arrows as shown.

The resin layer carrier film 404 is first coated with a neat resin material 430 in the resin coating station 429, such as by directing the film 404 into a basin, vat or other container 432 containing the neat resin material 430 (maintained at a desired level or volume 431). Suitable guide rollers or the like 425 direct the film layer 404 into the resin material 430. In this configuration, coating the film layer top surface 404*a* is required, and coating the film layer underside 404*b* is not required (but will occur as a result of submerging the film layer 404 into the neat resin material 430). Alternatively, the neat resin material 430 could be applied to the film layer top surface 404*a* using a suitable dispensing applicator (not shown) that directs the neat resin 430 onto the film layer top surface 404*a*. Ideally, the width of the resin carrier film 404 is approximately the same as the width of the nanoparticle carrier film 422. As will be understood, the speed of the resin carrier film section 403*a* is coordinated with the speed of the nanoparticle belt conveyor system 420*a*.

Much like with the embodiment of FIG. 9A, the neat resin itself may be a desired "A" Component or base matrix material of, for example, a two-component system, that will ultimately be used to create a hardened, nanoparticle-impregnated layer when exposed to the curing agent or "B" (second) Component of the two component system.

As the neat resin-coated carrier film 404 emerges from the vat 432 (or, alternatively, after the film layer top surface 404*a* is coated with the neat resin 430 via other coating techniques), the thickness of the resin coating or layer 434 may be adjusted, if necessary, to a desired thickness using a suitable technique. For example, the film 404 may be directed through an impingement or fixed-height scraper or doctored blade mechanism 426 to squeeze or scrape off excess neat resin 430 from the film top surface 404*a* so that a fine layer (of a desired thickness) of neat resin 434 remains on the film top surface 404*a*. For example, it is contemplated that the resulting a resin layer 434 be of a thickness of between 0.001" and 3.500", and more preferably of a thickness less than ½ inch, but in any event, in a suitable thickness for receiving a dispersion of nanoparticles 470*a* from the nanoparticle carrier belt 422. The neat resin material 430 that is removed from the film top surface 404*a* can then be recycled or reused by, e.g., returning it to the vat 432. In the configuration shown in FIG. 12A, the recycled neat resin material 430 removed by scraper 426 is permitted to flow/fall back into the vat 432.

The uniformly dispersed nanoparticle layer 470 enters the transfer operation section 402 at the entrance 402*a* where the layer 470 comes into contact with the film layer top side 404*a* containing the layer of neat resin material 434. The nanoparticle layer 470*a* remains in contact with the resin material 434 on the carrier film 404 through a contact zone 406 to thereby transfer the uniformly dispersed nanoparticles 470 from the carrier film 422 into the resin layer 434 on resin carrier film 404 to create a nanoparticle-impregnated resin layer 472. In one embodiment, a series of rollers (not shown) are used to squeeze or press together the layers 404*a*/434 with 422*a*/470*a* to transfer the nanoparticle layer 470a onto the resin layer 434 of the carrier film 404. Final placement of nanoparticles requires a pre-impregnated composite material with a resin matrix to be pressed together with the carrier film having the pre-processed nanoparticles from the nanoparticle deposition step. The pressing action will cause the nanoparticles to transfer from the carrier film to the pre-impregnated composite material.

The nanoparticle-infused resin matrix layer 472 then exits the contact zone 406 at exit 402b and travels (on top of carrier film 404a) the end product collection station 479 having a collection vat or bath 480 where the nanoparticle-impregnated matrix layer 472 is removed from the carrier film 404 and collected in the collection vat 480 to a desired level or volume 471. For example, the carrier film 404 containing the matrix layer 472 could be directed through one or more closely spaced rollers or impingement devices 482 that cause the layer 472 to slough off or otherwise be scraped off into collection vat 480. The collection vat 480 utilizes a low speed agitator 486 or other suitable stirring mechanism to mix the collected nanoparticle-infused matrix layer 472 to ensure that stratification of the nanoparticles does not occur. Preferably, the stirring in the bath 480 is continuous. The nanoparticle carrier film 422 continues in its loop back to the nanoparticle deposition section 464. The resin carrier film or belt 404a continues in its loop to again return to the resin vat 432 where the process can start again.

The collected nanoparticle infused resin materials 472 can then be discharged from the collection vat 480 via discharge port 484 for desired application 402, wherein the resin component 472 (containing the uniformly dispersed nanoparticles) will then be combined with or otherwise exposed to the matrix catalyzer "B" Component (not shown) as required for the curing process to create a hardened matrix or compound containing uniformly dispersed nanoparticles. As such, the apparatus and associated methodology depicted in FIG. 4 provides an advantageous method for creating an "A" Component or base matrix material having nanoparticles uniformly dispersed therethrough for use in, e.g., any application requiring use of a two component hardening system.

Although FIG. 12A illustrates the carrier film 422 being conveyed as a continuous loop system 420a, and illustrates the resin layer carrier film 404 being conveyed as a continuous loop system 403a, the nanoparticle dispersing system 400a of FIG. 12A could be, for example, split into two sections as illustrated in FIGS. 12B-1 and 12B-2. Referring to FIG. 12B-1 and FIG. 12B-2, the nanoparticle dispersing system 400b operates with two independent sections: a nanoparticle deposition section 420b (FIG. 12B-1) for depositing a uniformly dispersed nanoparticle layer 470a onto the carrier film top surface 422a; and a resin layer belt or carrier film looped conveyor system 403b (FIG. 12B-2) for integrating the nanoparticle layer 470a from the carrier film 422 into the neat resin layer or matrix layer 434 to create a nanoparticle-infused resin layer product 472. In this embodiment, referring to FIG. 12B-1, carrier sheet 422 (dispensed from a spool or roll 414a) is fed into the nanoparticle deposition zone 464 as in FIG. 12A (using motive mechanisms, such as motorized conveyors and the like). The dried nanoparticle-infused layer 470a can then be collected in the end product collection station 415 on, e.g., a nanoparticle-infused layer collection spool 416a. The collected nanoparticle-infused layer 470a can then be dispensed from a spool 416b. As will be appreciated, the collection spool 416a can later become the dispensing spool 416b. The nanoparticle-infused layer 470a (on carrier sheet 422) is then fed into the transfer operation section entrance 402a as in FIG. 12A (using motive mechanisms, such as motorized conveyors and the like). The thus-formed nanoparticle-infused resin layer product 472 is collected as in FIG. 12A into vat 480. The carrier sheet 422 can then be collected in a carrier film collection section 413 on, e.g., a collection spool 414b. As will be appreciated, the carrier sheet collection spool 414b can later become the carrier sheet dispensing spool 414a. The carrier sheet 404 then continues in its loop back to the resin vat 432.

Alternate embodiments are shown in FIGS. 12C-1, 12C-2, and 12D. In the embodiment shown in FIGS. 12C-1 and 12C-2, the nanoparticle dispersing system 400a of FIG. 12A could be, for example, split into two sections as illustrated in FIGS. 12C-1 and 12C-2. Referring to FIG. 12C-1 and FIG. 12C-2, the nanoparticle dispersing system 400c operates with two independent sections: a nanoparticle deposition section 420c (FIG. 12C-1) (similar to FIG. 4B-1) for depositing a uniformly dispersed nanoparticle layer 470a onto the carrier film top surface 422a; and a resin layer belt or carrier film conveyor system 403c (FIG. 12C-2) for integrating the nanoparticle layer 470a from the carrier film 422 into the neat resin layer or matrix layer 434 to create a nanoparticle-infused resin layer product 472. In this embodiment, referring to FIG. 12C-1, carrier sheet 422 (dispensed from a spool or roll 414a) is fed into the nanoparticle deposition zone 464 as in FIG. 12A (using motive mechanisms, such as motorized conveyors and the like). The dried nanoparticle-infused layer 470a can then be collected on a nanoparticle-infused layer collection spool 416a. The collected nanoparticle-infused layer 470a can then be dispensed from a spool 416b. As will be appreciated, the collection spool 416a can later become the dispensing spool 416b. The nanoparticle-infused layer 470a (on carrier sheet 422) is then fed into the transfer operation section entrance 402a as in FIG. 12A (using motive mechanisms, such as motorized conveyors and the like). However, rather than operating as a looped conveyor system (see FIG. 12A, 403a), the resin layer carrier film 404 is fed from a dispensing spool 405a, and collected at the other end of the operation in the resin carrier film collection station 407 on a receiving spool 405b. The thus-formed nanoparticle-infused resin layer product 472 is collected as in FIG. 12A into vat 480.

Figure 12D:
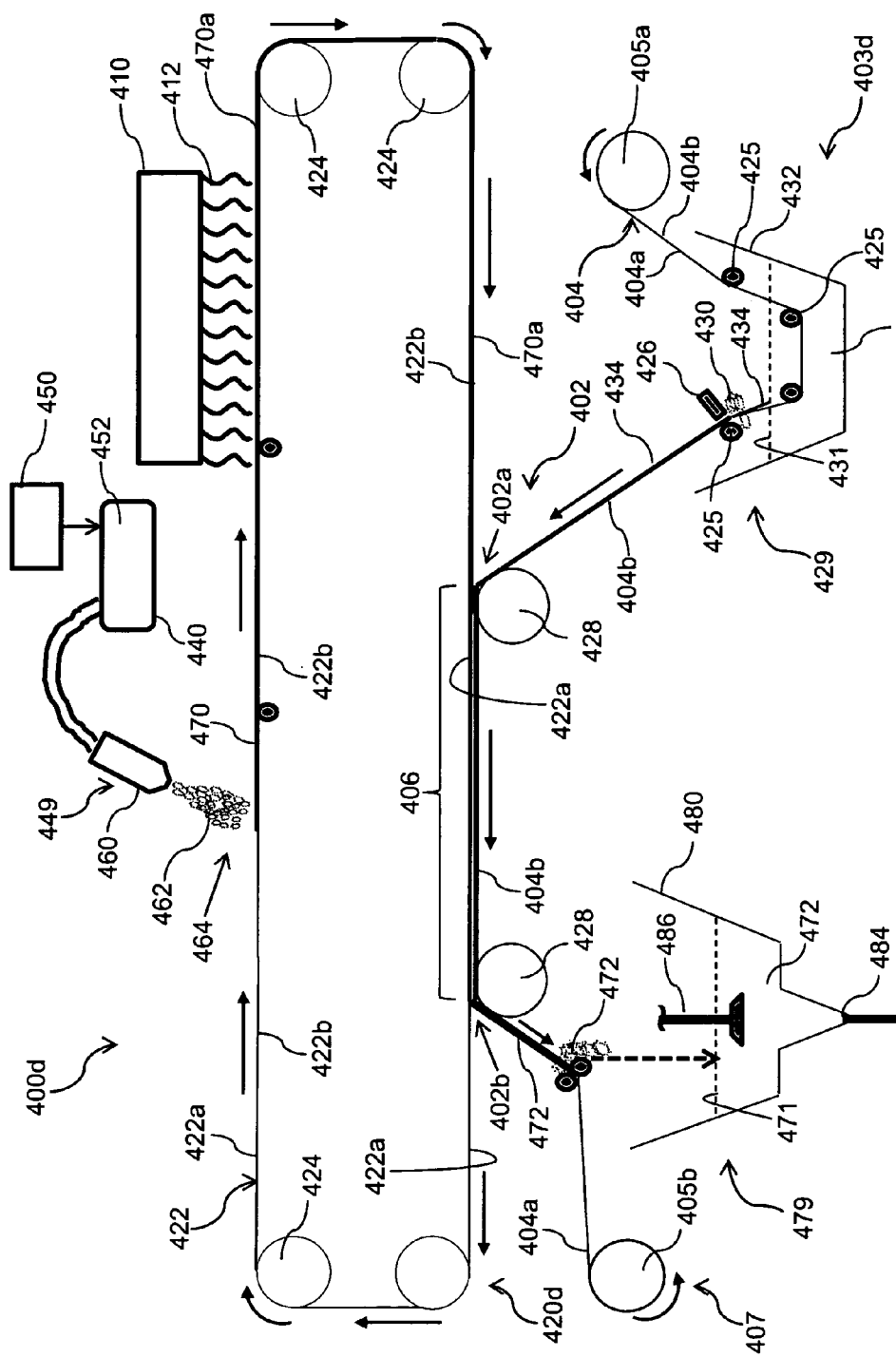
FIG. 12D schematically illustrates a variation of the method and system for dispersing nanoparticles into a matrix shown in FIG. 12A.

In the embodiment of FIG. 12D, there is depicted a nanoparticle dispersing system 400d wherein the nanoparticle deposition section 420d operates as a looped conveyor system as in FIG. 12A, and the resin belt carrier film conveyor system operates as a non-looped system as in FIG. 12C-2.

As will be appreciated by one of ordinary skill in the art having the benefit of the present disclosure, the systems and methodologies described herein can advantageously be used with any nanoparticles or functionalized nanoparticles. Although four exemplary embodiments have been disclosed for creating uniform dispersions of nanoparticles, other methodologies will become apparent to one of ordinary skill in the art who has had the benefit of the teachings in the present disclosure.

The present invention, therefore, provides in some, but not in necessarily all embodiments a treated member including: a member with an area; a fabric device on the area, the fabric device having at least one layer of fabric, the fabric made of composite material, the at least one layer of fabric having a first surface and a second surface spaced-apart from the first surface, nanomaterial bonded to at least one surface of the fabric, and a resin matrix on the fabric over the nanomaterial; and such a treated member wherein the member has a degraded area and the fabric device is applied to the degraded area.

All references referred to herein are incorporated herein by reference. While the apparatus, systems and methods of this invention have been described in terms of preferred or illustrative embodiments, it will be apparent to those of skill in the art that variations may be applied to the process and system described herein without departing from the concept and scope of the invention. All such similar substitutes and modifications apparent to those skilled in the art are deemed to be within the scope and concept of the invention. Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art.

U.S. PATENT REFERENCES

1. U.S. Pat. No. 4,676,276, 1987 Jun. 30 Fawley
2. U.S. Pat. No. 4,700,752, 1987 Oct. 20 Fawley
3. U.S. Pat. No. 5,348,801, 1994 Sep. 24 Venzi et al.
4. U.S. Pat. No. 5,445,848, 1995 Aug. 29 Venzi et al.
5. U.S. Pat. No. 5,632,307, 1997 May 24 Fawley et al.
6. U.S. Pat. No. 5,877,110, 1999 Mar. 22 Synder et al.
7. U.S. Pat. No. 5,965,470, 1999 Oct. 12 Bening et al.
8. U.S. Pat. No. 6,203,814, 2001 Mar. 20 Fisher et al.
9. U.S. Pat. No. 6,276,214, 2001 Aug. 21 Kimura et al.
10. U.S. Pat. No. 6,276,401, 2001 Aug. 21 Wilson
11. U.S. Pat. No. 6,284,832, 2001 Sep. 4 Foulger et al.
12. U.S. Pat. No. 6,299,812, 2001 Oct. 9 Newman et al.
13. U.S. Pat. No. 6,368,569, 2002 Apr. 9 Haddon et al.
14. U.S. Pat. No. 6,417,265, 2002 Jul. 9 Foulger
15. U.S. Pat. No. 6,569,937, 2003 May 27 Foulger et al.
16. U.S. Pat. No. 6,682,677, 2004 Jan. 27 Lobovsky et al.
17. U.S. Pat. No. 6,712,864, 2004 Mar. 30 Horiuchi et al.
18. U.S. Pat. No. 6,723,299, 2004 Apr. 20 Chen et al.
19. U.S. Pat. No. 6,774,066, 2004 Aug. 10 Souza et al.
20. U.S. Pat. No. 6,783,702, 2004 Aug. 31 Niu et al.
21. U.S. Pat. No. 6,783,746, 2004 Aug. 31 Zhang et al.
22. U.S. Pat. No. 6,790,425, 2004 Sep. 14 Smalley et al.
23. U.S. Pat. No. 6,790,790, 2004 Sep. 14 Lyons et al.
24. U.S. Pat. No. 6,825,060, 2004 Nov. 30 Lyons et al.
25. U.S. Pat. No. 6,866,891, 2005 Mar. 15 Liebau et al.
26. U.S. Pat. No. 6,875,412, 2005 Apr. 5 Margrave et al.
27. U.S. Pat. No. 6,905,667, 2005 Jun. 14 Chen et al.
28. U.S. Pat. No. 6,908,261, 2005 Jun. 21 Hannay et al.
29. U.S. Pat. No. 6,921,462, 2005 Jul. 26 Montgomery et al.
30. U.S. Pat. No. 6,949,216 A 2005 Sep. 27 Brice et al.
31. U.S. Pat. No. 7,093,664, 2006 Aug. 22 Todd et al.
32. U.S. Pat. No. 7,094,367, 2006 Aug. 22 Harmon et al.
33. U.S. Pat. No. 7,105,596, 2006 Sep. 12 Smalley et al.
34. U.S. Pat. No. 7,122,461, 2006 Oct. 17 Dubin
35. U.S. Pat. No. 7,125,533, 2006 Oct. 24 Khabashesku et al.
36. U.S. Pat. No. 7,153,903, 2006 Dec. 26 Barraza et al.
37. U.S. Pat. No. 7,367,362, 2008 May 6 Rice et al.
38. U.S. Pat. No. 7,387,138, 2008 Jun. 17 Rice et al.
39. U.S. Pat. No. 7,426,942, 2008 Sep. 23 Rice
40. U.S. Pat. No. 7,479,516, 2009 Jan. 20 Chen et al.
41. U.S. Pat. No. 7,500,494, 2009 Mar. 10 Robinson et al.
42. U.S. Pat. No. 7,523,764, 2009 Apr. 28 Lepola et al.
43. U.S. Pat. No. 7,601,421, 2009 Oct. 13 Khabashesku et al.

U.S. PATENT APPLICATION PUBLICATIONS 1. 20100090175, 2010 Apr. 15 Krishnamoorti et al.
2. 20100098931, 2010 Apr. 22 Daniel et al.
3. 20100113696, 2010 May 6 Khabashesku et al.
4. 20100143701, 2010 Jun. 10 Zhu et al.

NON-PATENT LITERATURE DOCUMENTS

1. Berger, Michael, "Functionalization of carbon nanotubes is key to electrochemical nanotechnology devices", Nanowerk Spotlight, Nanowerk LLC, Sep. 17, 2008, accessed Feb. 23, 2012, http://www.nanowerk.com/spotlight/spotid=7288.php
2. Yan, et al., "Rational Functionalization of Carbon Nanotubes Leading to Electrochemical Devices with Striking Applications", Advanced Materials, Vol. 20, Issue 15, pp. 2899-2906 (Aug. 4, 2008) (Abstract) accessed Feb. 23, 2012, http://onlinelibrary.wiley.com/doi/10.1002/adma.200800674/abstract;jsessionid=4929790B1B1D5535DF18AFC78999B127.d02t02
3. Korneva, G., "Functionalization of Carbon Nanotubes", Thesis, Drexel University, May 2008, accessed Feb. 23, 2012, http://idea.library.drexel.edu/bitstream/1860/2797/1/Korneva_Guzeliya.pdf
4. Balasubramanian, K. and Burghard, M., "Chemically Functionalized Carbon Nanotubes", small, 2005, 1, No. 2, 180-192, available online at http://www.tinhoahoc.com/Nanotechnology/C-nanotube-Small02-2005.pdf
5. THOSTENSON. E. T.; Ll. W. Z.; WANG; D. Z. REN; Z. F.; CHOU, T. W.; "Carbon nanotube/carbon fiber hybrid multiscale composites", Journal of Applied Physics, Vol. 91, No. 9, pp. 6034-6037, May, 2002.
6. COOPER, CAROLE A.; COHEN, SIDNEY R.; BARBER, ASA H.; WAGNER, H. DANIEL; "Detachment of nanotubes from a polymer matrix", Applied Physics Letters, Vol. 81, No. 20, pp. 3873-3875, November, 2002.
7. BARBER, ASA H.; COHEN, SIDNEY R.; WAGNER, H. DANIEL; "Measurement of carbon nanotube-polymer interfacial strength", Applied Physics Letters, Vol. 82, No. 23, pp. 4140-4142, June, 2003.
8. SCHADLER, L. S.; GIANNARIS, S. C.; AJAYAN, P. M.; "Load transfer in carbon nanotube epoxy composites", Vol. 73, No. 26, pp. 3842-3844, December, 1998.
9. QIAN, D.; DICKEY, E. C.; ANDREWS, R.; RANTELL, T.; "Load transfer and deformation mechanisms in carbon nanotube-polystrene composites", Applied Physics Letters, Vol. 76, No. 20, pp. 2868-2870 May, 2000.
10. BEKYAROVA, E.; THOSTENSON, E. G.; YU, A; KIM, H.; GAO, J.; TANG, J.; HAHN, H. T.; CHOU, T. W.; ITKIS, M. E.; HADDON, R. C.; "Multiscale Carbon Nanotube-Carbon Fiber Reinforcement for Advanced Epoxy Composites"; American Chemical Society, Langmuir 2007, 23, 3970-3974.

What is claimed is:

1. A system for dispersing nanoparticles into a matrix comprising:
   a. a moveable carrier film capable of moving in a first direction through the system, the carrier film having a top side and an under side;
   b. a carrier film conveyor system capable of moving the carrier film;
   c. a resin coating station comprising a basin containing a desired neat resin material at a desired level, the basin comprising an entrance capable of receiving the carrier film, one or more guides to direct the carrier film into the resin material to permit at least the carrier film top side to become coated with the resin material, and an exit where the resin coated carrier film is discharged from the resin coating station;

d. a nanoparticle deposition station having an entrance proximate to the resin coating station exit for receiving the resin coated carrier film and an exit, the nanoparticle deposition station further comprising a mixing chamber containing a solution of suspended nanoparticles and a nanoparticle spray unit capable of receiving the suspended nanoparticles from the mixing chamber and spraying the suspended nanoparticles through a spray nozzle in a desired spray pattern towards the top surface of the resin coated carrier film to create a nanoparticle-infused resin matrix layer; and e. an end product collection station for receiving the carrier film containing the nanoparticle-infused resin matrix layer, the end product collection station comprising an impingement device to remove the nanoparticle infused resin matrix layer from the top of the carrier film as the carrier film passes therethrough, a collection vat for receiving the removed nanoparticle-infused resin matrix layer, the collection vat having a low speed agitator for mixing the contents of the collection vat, and a discharge port for discharging the collected nanoparticle-infused resin matrix layer end product.

2. The system of claim 1 wherein the resin coating station guides are rollers.

3. The system of claim 1 wherein the resin coating station further comprises a scraper proximate to the resin coating station exit for adjusting the thickness of the coating of resin material on the carrier film top side.

4. The system of claim 1 wherein the spray nozzle is an atomizer nozzle spraying the suspended nanoparticle solution toward the resin coated carrier film top surface in a near solvent-free state.

5. The system of claim 1 wherein the nanoparticles are functionalized.

6. The system of claim 1 wherein the mixing chamber further comprises a source of sonication for maintaining the solution of suspended nanoparticles in a suspended state.

7. The system of claim 1 wherein the carrier film is moved through the system in a continuous loop.

8. The system of claim 1 wherein the carrier film is moved through the system in a single pass through.

9. A system for dispersing nanoparticles into a fabric matrix comprising:

a. a moveable carrier film capable of moving in a first direction through the system, the carrier film having a top side and an under side;

b. a carrier film conveyor system capable of moving the carrier film;

c. a nanoparticle deposition station having an entrance for receiving the carrier film and an exit, the nanoparticle deposition station further comprising a mixing chamber containing a solution of nanoparticles suspended in a solvent and a nanoparticle spray unit capable of receiving the suspended nanoparticle solution from the mixing chamber and spraying the suspended nanoparticle solution through a spray nozzle in a desired spray pattern towards the top surface of the carrier film to deposit the nanoparticles onto the top surface of the carrier film;

d. a heating section for drying any residual solvent from the nanoparticles deposited onto the top surface of the carrier film;

e. a moveable fabric layer capable of moving in a first direction through the system, the fabric layer having a top side and an under side;

f. a fabric layer conveyor system capable of moving the fabric layer;

g. a resin coating station comprising a basin containing a desired neat resin material at a desired level, the basin comprising an entrance capable of receiving the fabric layer, one or more guides to direct the fabric layer into the resin material to permit at least the fabric layer top side to become coated with the resin material, and an exit where the resin coated fabric layer is discharged from the resin coating station;

h. a transfer operation section having an entrance and an exit, and contact zone between the transfer section entrance and exit, the transfer operation section capable of receiving the nanoparticle-coated carrier film and the resin-coated fabric layer and passing both through the contact zone so that the top side of the carrier film containing the nanoparticles is in contact with the top side of the resin-coated fabric layer to thereby permit the nanoparticles on the carrier film to be transferred to the resin-coated fabric layer to create a nanoparticle-infused resin fabric product; and i. an end product collection station for receiving the nanoparticle-infused resin fabric product.

10. The system of claim 9 wherein the end product collection station comprises one or more spools for receiving the nanoparticle-infused resin fabric product.

11. The system of claim 9 wherein the contact zone comprises one or more sets of impingement devices to compress the carrier film and fabric film together.

12. The system of claim 9 wherein the carrier film is moved through the system in a continuous loop.

13. The system of claim 9 wherein the carrier film is not a continuous loop, and is moved through the nanoparticle deposition station and heating section in a single pass through to create a carrier film end product having a nanoparticle coating on the carrier film top surface, wherein the nanoparticle-coated carrier film end product may be directed to a carrier film end product collection station, wherein the collected nanoparticle-coated carrier film may be introduced into the transfer operation system to serve as the source of the nanoparticle-coated carrier film, and wherein the carrier film exits the transfer operation section and is collected in a carrier film collection station.

14. A system for dispersing nanoparticles into a fabric matrix comprising:

a. a moveable fabric layer capable of moving in a first direction through the system, the fabric layer having a top side and an under side;

b. a fabric layer conveyor system capable of moving the fabric layer;

c. a resin coating station comprising a basin containing a desired neat resin material at a desired level, the basin comprising an entrance capable of receiving the fabric layer, one or more guides to direct the fabric layer into the resin material to permit at least the fabric layer top side to become coated with the resin material, and an exit where the resin coated fabric layer is discharged from the resin coating station;

d. a nanoparticle deposition station having an entrance proximate to the resin coating station exit for receiving the resin coated fabric layer and an exit, the nanoparticle deposition station further comprising a mixing chamber containing a solution of suspended nanoparticles and a nanoparticle spray unit capable of receiving the suspended nanoparticles from the mixing chamber and spraying the suspended nanoparticles through a spray nozzle in a desired spray pattern towards the top surface of the resin coated fabric layer to create a nanoparticle-infused resin fabric layer;

e. a heating section for drying any residual solvent from the nanoparticles deposited onto the top surface of the fabric layer; and f. an end product collection station for receiving the fabric layer containing the nanoparticle-infused resin matrix layer, the end product collection station comprising an impingement device to remove the nanoparticle infused resin matrix layer from the top of the carrier film as the carrier film passes therethrough, a collection vat for receiving the removed nanoparticle-infused resin matrix layer, the collection vat having a low speed agitator for mixing the contents of the collection vat, and a discharge port for discharging the collected nanoparticle-infused resin matrix layer end product.

15. A system for dispersing nanoparticles into a matrix comprising:

a. a first moveable carrier film capable of moving in a first direction through the system, the first carrier film having a top side and an under side;

b. a first carrier film conveyor system capable of moving the first carrier film;

c. a nanoparticle deposition station having an entrance for receiving the first carrier film and an exit, the nanoparticle deposition station further comprising a mixing chamber containing a solution of nanoparticles suspended in a solvent and a nanoparticle spray unit capable of receiving the suspended nanoparticle solution from the mixing chamber and spraying the suspended nanoparticle solution through a spray nozzle in a desired spray pattern towards the top surface of the first carrier film to deposit the nanoparticles onto the top surface of the first carrier film;

d. a heating section for drying any residual solvent from the nanoparticles deposited onto the top surface of the first carrier film;

e. a second moveable carrier film capable of moving in a first direction through the system, the second carrier film having a top side and an under side;

f. a second carrier film conveyor system capable of moving the second carrier film;

g. a resin coating station comprising a basin containing a desired neat resin material at a desired level, the basin comprising an entrance capable of receiving the second carrier film, one or more guides to direct the second carrier film into the resin material to permit at least the second carrier film top side to become coated with the resin material, and an exit where the resin coated second carrier film is discharged from the resin coating station;

h. a transfer operation section having an entrance and an exit, and contact zone between the transfer section entrance and exit, the transfer operation section capable of receiving the nanoparticle-coated first carrier film and the resin-coated second carrier film and passing both through the contact zone so that the top side of the first carrier film containing the nanoparticles is in contact with the top side of the resin-coated second carrier film to thereby permit the nanoparticles on the first carrier film to be transferred to the resin-coated second carrier film to create a nanoparticle-infused resin product; and i. an end product collection station for receiving the second carrier film containing the nanoparticle-infused resin matrix layer, the end product collection station comprising an impingement device to remove the nanoparticle-infused resin matrix layer from the top of the second carrier film as the carrier film passes therethrough, a collection vat for receiving the removed nanoparticle-infused resin matrix layer, the collection vat having a low speed agitator for mixing the contents of the collection vat, and a discharge port for discharging the collected nanoparticle-infused resin matrix layer end product.

16. The system of claim 15 wherein the contact zone comprises one or more sets of impingement devices to compress the carrier film and fabric film together.

17. The system of claim 15 wherein the first carrier film is moved through the system in a continuous loop, and the second carrier film is moved through the system in a continuous loop.

18. The system of claim 15 wherein:

the second carrier film is moved through the system in a continuous loop; and the first carrier film is not a continuous loop, and is moved through the nanoparticle deposition station and heating section in a single pass through to create a first carrier film end product having a nanoparticle coating on the first carrier film top surface, wherein the nanoparticle-coated first carrier film end product may be directed to a first carrier film end product collection station, wherein the collected nanoparticle-coated first carrier film may be introduced into the transfer operation system to serve as the source of the nanoparticle-coated first carrier film, and wherein the first carrier film exits the transfer operation section and is collected in a first carrier film collection station.

19. The system of claim 15:

wherein the first carrier film is not a continuous loop, and is moved through the nanoparticle deposition station and heating section in a single pass through to create a first carrier film end product having a nanoparticle coating on the first carrier film top surface; wherein the nanoparticle-coated first carrier film end product may be directed to a first carrier film end product collection station;

wherein the collected nanoparticle-coated first carrier film may be introduced into the transfer operation system to serve as the source of the nanoparticle-coated first carrier film; wherein the first carrier film exits the transfer operation section and is collected in a first carrier film collection station; and wherein the second carrier film is not a continuous loop, and is moved through the resin coating station and through the transfer operation station in a single pass through, and collected in the second carrier film collection station.

20. The system of claim 15 wherein:

the first carrier film is moved through the system as a continuous loop; and the second carrier film is not a continuous loop, and is moved through the resin coating station and through the transfer operation station in a single pass through, and collected in the second carrier film collection station.

* * * * *